(12) United States Patent
Liang et al.

(10) Patent No.: US 11,132,645 B2
(45) Date of Patent: Sep. 28, 2021

(54) JOB APPLICANT PROBABILITY OF CONFIRMED HIRE

(71) Applicant: Microsoft Technology Licensing, LLC, Redmond, WA (US)

(72) Inventors: Keqing Liang, Sunnyvale, CA (US); Vibhu Prakash Saxena, Sunnyvale, CA (US); Jason Phan, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 506 days.

(21) Appl. No.: 15/660,779

(22) Filed: Jul. 26, 2017

(65) Prior Publication Data

US 2019/0034883 A1 Jan. 31, 2019

(51) Int. Cl.
*G06Q 10/10* (2012.01)
*G06N 5/00* (2006.01)
(Continued)

(52) U.S. Cl.
CPC ......... *G06Q 10/1053* (2013.01); *G06N 5/003* (2013.01); *G06N 5/04* (2013.01); *G06N 20/20* (2019.01); *G06Q 50/01* (2013.01)

(58) Field of Classification Search
None
See application file for complete search history.

(56) References Cited

U.S. PATENT DOCUMENTS

2009/0299993 A1* 12/2009 Novack .............. G06Q 30/0601
2013/0246294 A1* 9/2013 Pendyala ........... G06Q 10/1053
705/321

(Continued)

FOREIGN PATENT DOCUMENTS

WO WO-2019023364 A1 1/2019

OTHER PUBLICATIONS

Yuan-Hui Tsai, Chieh-Peng Lin, Ya-Chu Hsu, Chu-Mei Liu, Pi-Hsia Yen, "Predicting job offer acceptance of professionals in Taiwan : The case of the technology industry, Technological Forecasting and Social Change," vol. 108, 2016, pp. 95-101, ISSN 0040-1625 (Year: 2016).*

(Continued)

*Primary Examiner* — Andrew B Whitaker
(74) *Attorney, Agent, or Firm* — Schwegman Lundberg & Woessner, P.A.

(57) ABSTRACT

Techniques for predicting relevance of social networking service member accounts to a job posting. In an embodiment, a candidate predictor engine of a system encodes data representing an applicant quality (AQ) score for each job/applicant pair for a plurality of applicants to a job posting. Additionally, the system stores the encoded data and assigns member-level weights to each of the applicants. Moreover, the system calculates weighted AQ scores for each of the job/applicant pairs, the weighted AQ scores being products of respective AQ scores and member-level weights. Furthermore, the system sums the weighted AQ scores to derive a total weighted score for the job posting. Then, the candidate predictor engine generates a job-level probability of confirmed hire (pCH) based on the total weighted score, the job-level pCH indicating a likelihood of the posting being filled by an applicant. Also, the system transmits the job-level pCH to a client for display.

20 Claims, 22 Drawing Sheets

(51) Int. Cl.
*G06Q 50/00* (2012.01)
*G06N 20/20* (2019.01)
*G06N 5/04* (2006.01)

(56) References Cited

U.S. PATENT DOCUMENTS

| | | | |
|---|---|---|---|
| 2014/0317079 A1* | 10/2014 | Obernikhin | G06F 16/2468 707/706 |
| 2015/0127565 A1* | 5/2015 | Chevalier | G06Q 30/00 705/319 |
| 2017/0004455 A1* | 1/2017 | Tang | G06N 5/025 |
| 2017/0193394 A1 | 7/2017 | Fang | |
| 2018/0268373 A1* | 9/2018 | Bheemavarapu | G06Q 10/1053 |

OTHER PUBLICATIONS

"International Search Report and Written Opinion issued in PCT Application No. PCT/US18/043726", dated Oct. 15, 2018, 8 Pages.

\* cited by examiner

HIGH QUALITY APPLICANT

| JOB | APPLICANT | APPLICANT QUALITY SCORE | X | MEMBER LEVEL pCH WEIGHTING | = | FINAL WEIGHTED QUALITY SCORE |
|---|---|---|---|---|---|---|
| 1100 | ② | ① | | | | |
| | | .35 | | 2.86 | | 1.00 |
| | | .50 | X | 3.38 | | 1.69 |
| | | .15 | | 1.62 | | 0.24 |
| | | .75 | | 3.97 | | 2.98 |
| | | | | ▪ | | |
| | | | | ▪ | | |
| | | | | ▪ | | |

③ TOTAL WEIGHTED SCORE: 31.4 — 1106

JOB-LEVEL pCH: 10% — 1108

JOB APPLICANT PROBABILITY OF CONFIRMED HIRE

TECHNICAL FIELD

The present disclosure generally relates to data processing systems. More specifically, the present disclosure relates to methods, systems and computer program products for inferring relevance between a member account(s) and a job posting(s).

BACKGROUND

A social networking service is a computer- or web-based application that enables users to establish links or connections with persons for the purpose of sharing information with one another. Some social networking services aim to enable friends and family to communicate with one another, while others are specifically directed to business users with a goal of enabling the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks").

With many social networking services, members are prompted to provide a variety of personal information, which may be displayed in a member's personal web page. Such information is commonly referred to as personal profile information, or simply "profile information", and when shown collectively, it is commonly referred to as a member's profile. For example, with some of the many social networking services in use today, the personal information that is commonly requested and displayed includes a member's age, gender, interests, contact information, home town, address, the name of the member's spouse and/or family members, and so forth. With certain social networking services, such as some business networking services, a member's personal information may include information commonly included in a professional resume or curriculum vitae, such as information about a person's education, employment history, skills, professional organizations, and so on. With some social networking services, a member's profile may be viewable to the public by default, or alternatively, the member may specify that only some portion of the profile is to be public by default. Accordingly, many social networking services serve as a sort of directory of people to be searched and browsed.

DESCRIPTION OF THE DRAWINGS

Some embodiments are illustrated by way of example and not limitation in the figures of the accompanying drawings in which.

DETAILED DESCRIPTION

Figure 1:
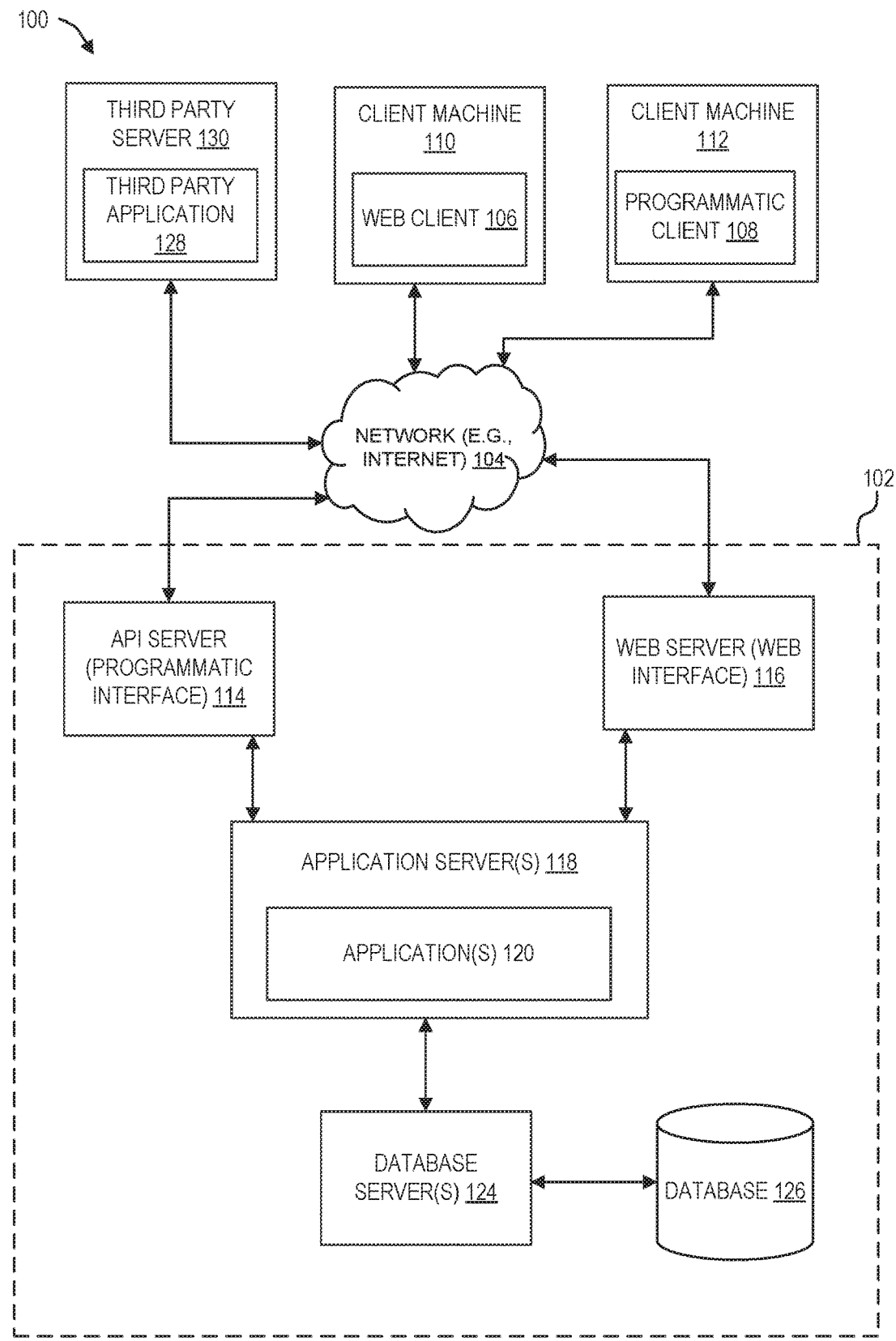
FIG. 1 is a block diagram showing a client-server system, according to various embodiments.

The present disclosure describes methods and systems for predicting a relevance of target social networking service member accounts to a job posting (e.g., a posting for a position that an organization is seeking to fill). The methods and systems use a metric that assigns each job a score representing the probability that a posting for the job will result in a confirmed hire. In the following description, for purposes of explanation, numerous specific details are set forth in order to provide a thorough understanding of the various aspects of different embodiments of the present inventive subject matter. It will be evident, however, to one skilled in the art, that the present inventive subject matter may be practiced without all of the specific details.

As used herein, the term "probability of confirmed hire" (pCH) generally refers to a metric representing the likelihood that a given job will be filled. In embodiments, a pCH metric incorporates the impact of 1) applicant quantity, 2) applicant quality, and 3) certain job attributes (e.g., organization/company size, application channel, and application path). For applicant quality, a model is used to predict the likelihood that a given professional social network service member is a "high-quality" candidate for a given job posting. Training data for the model includes historical, actual hiring data (e.g., previous decisions on whether to extend job offer(s) to a social networking service member).

A system, a machine-readable storage medium storing instructions, and a computer-implemented method are described herein for analyzing candidate characteristics and job characteristics to determine a likelihood that a candidate will be hired to fill a job. In embodiments, the system, instructions, and method assign a pCH to a job, where the pCH equals the probability that a posting for the job will result in a confirmed hire. The system, instructions, and method accomplish this by incorporating the impact of applicant quantity (e.g., a number of applications submitted in response to a particular job posting), applicant quality, and certain attributes of the job. In some embodiments, applicant quality is determined using an applicant quality (AQ) model as a starting point. Example job attributes include a size (e.g., small, medium, or large) of an organization seeking to fill the job, an application channel, and an application path. In some embodiments, an application channel is an online channel when an applicant applies via an organization's site, and an application channel is a field channel when an applicant applies via a professional social network service (e.g., via a recruiting tool hosted by the professional social network service). According to some embodiments, an application path is an on-site path when an applicant applies via a professional social network service, and an application path is an off-site path when an applicant applies from outside of a professional social network service (e.g., directly via an organization's site).

In accordance with some embodiments, a pCH score is a percentage representing the probability of a confirmed hire for a given job posting. In some embodiments, a pCH score is strongly correlated to quality applications (i.e., candidates and applicants for the job having relatively high AQ scores). By assigning pCH scores, embodiments enable users, such as, for example, recruiters and employers using a professional social network service, to assess applicant distributions.

Embodiments advantageously improve upon existing techniques and recruiting tools that rely upon binary metrics that are limited to categorizing job applicants as either successful or not. For example, in contrast to the non-binary pCH metric disclosed herein, existing binary metrics cannot show hiring gains resulting from increasing application volume (e.g., within 0-25 additional applicants per job listing). Traditional binary metrics also do not incorporate any applicant quality signals or measurements, such as, for example, AQ scores that contribute to pCH scores. The pCH metric described herein also improves upon traditional binary metrics because such binary metrics are inflexible across different types of jobs. For example, unlike binary metrics, pCH scores are flexible across different types of job applications (e.g., on-site applications and off-site applications). Further, for example, in contrast to binary metrics, pCH scores are flexible across different organization sizes (e.g., small, medium, and large companies that are seeking to fill positions).

Embodiments employ an AQ model that uses candidate management events as a source of designating relative quality of applicants applying to a job posting. In example embodiments, the applicants are members of a professional social network service and the job posting is accessible from the professional social network service. In some embodiments, the AQ model assigns positive AQ scores to applicants in response to certain events that indicate that the applicant is desirable as a candidate for a job listing, and the AQ model assigns negative AQ scores in response to other events indicating that the applicant is not a good fit for the job listing. For example, the AQ model increases AQ scores of applicants in response to determining that a job poster or recruiter sends an email to the applicants via a professional social network service. Also, for example, the AQ model increases AQ scores of applicants in response to determining that a job poster or recruiter labels the applicants as being a "good fit" for a job listing. Conversely, the AQ model decreases AQ scores of applicants in response to determining that a job poster or recruiter labels the applicants as "not a fit" for a job listing. Embodiments leverage the AQ scores to determine weights for pCH scores.

In some embodiments, the AQ model uses standardized features from member profiles (e.g., profile attributes for a profile of a member of a professional social network service) and standardized features from job descriptions to train a random forest model. Examples of job features include function, industry, geographic location of job (e.g., country, state, province, region, or city), and organization size (e.g., small, medium, or large company size). Examples of member profile features include seniority (e.g., years of experience), skills, title/supertitle, and geographic location of member (e.g., residence or citizenship country, work visa country, residence state, residence province, residence region, or residence city).

In certain embodiments, the standardized job and member profile features are used to create mappings between a job and members. That is, mappings may be created for each job-member pair based on standardized job features and standardized member profile features. A job poster can then look at these mappings to readily identify members of the professional social network service who are likely to be good fits for a job posting.

Figure 9:
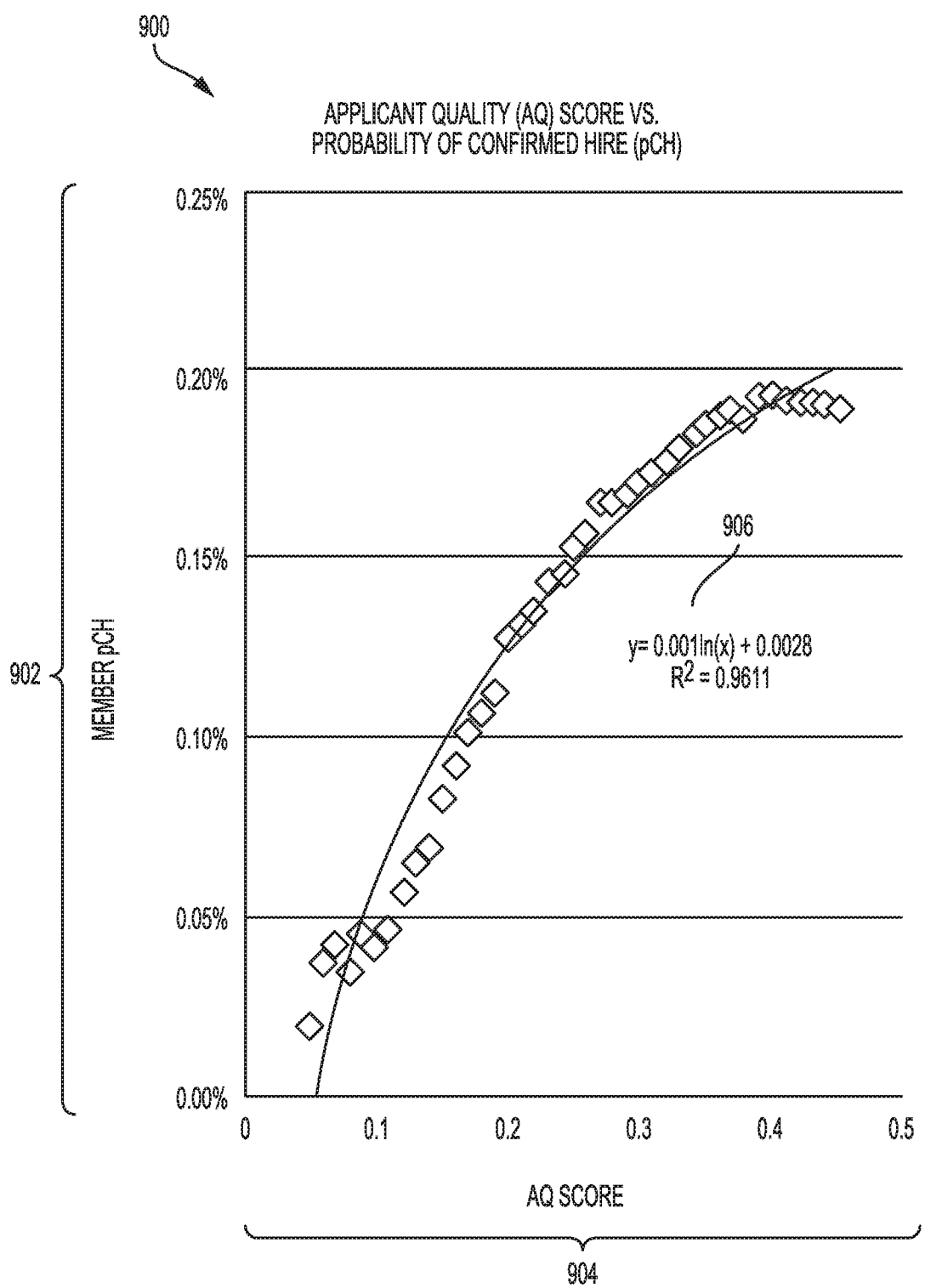
FIG. 9 is a chart depicting correlations between applicant quality (AQ) scores and probabilities of confirmed hire (pCH), according to some embodiments.

According to certain embodiments, methods leverage the fact that a higher-quality applicant (e.g., an applicant with a relatively high AQ score) will have a greater likelihood of becoming a confirmed hire. An example method determines a weighted AQ score for job/applicant pairs. For instance, the method includes assigning an AQ score for every job/applicant pair in a group of applicants for a given job posting, where the AQ score is based on the AQ model described herein. As shown in FIG. 9, discussed below, there is a strong correlation between higher AQ scores and a probability of a confirmed hire for a job posting (i.e., a job-level pCH). That is, a job's performance is correlated to its number of qualified applicants, and the job-level pCH is highly correlated to the number of applicants. In some embodiments, to incorporate a pCH lift from quality signals, a method assigns a greater weighting to applicants with higher quality scores. Each job's probability of receiving a confirmed hire is also determined by job-level characteristics. That is, job-level characteristics impact job-level pCH. Examples of such job-level characteristics include application channel, application path, and organization size (e.g., size of a company posting the job).

Certain embodiments prioritize three dimensions to set pCH scores: organization size (i.e., size of a company posting a job); channel; and application path. For organization size, an example method avoids overstating hires for larger organizations (e.g., companies, government agencies, educational institutions, and other hiring organizations). For channel, embodiments set pCH scores based on trends in historical data indicating that field-channel jobs generally outperform online-channel jobs because of large organization/company sizes in field-channel jobs. For application path, higher pCH scores are generally set for organizations and companies that collect applications off-site (e.g., outside of a professional social network service) than for organizations and companies that collect applications via a professional social network service (e.g., via an apply-click interface within the professional social network service). This is done to account for historical trends indicating that larger hiring organizations tend to collect off-site. By using three dimensions to set pCH scores instead of relying solely on one dimension, example methods avoid biases in score distributions due to other dimensions. In this manner, pCH scores set by combining the above-noted three dimensions together avoid biasing pCH scores in favor of one dimension. For example, combining multiple dimensions to set pCH scores avoids issues with biasing pCH scores in favor of larger organizations.

In example embodiments, the AQ model assigns AQ scores to job candidates using a candidate predictor engine ("C.P. engine"). The C.P. engine instantiates data structure(s) modeled according to a plurality of job candidate predictor decision trees. The C.P. engine encodes data representing a job candidate context feature set based on an attribute(s) of a target candidate account and an attribute(s) of a job posting. The C.P. engine filters each respective feature from the job candidate context feature set through a job candidate predictor decision tree that corresponds to a same job candidate context feature type as the respective feature. The C.P. engine generates prediction output based on each result of filtering through the job candidate predictor decision trees. The prediction output indicates a likelihood of the target candidate account being qualified for the job posting. In turn, this likelihood is used to determine a total, job-level weighted score that is calculated as a sum of weighted AQ scores for job/applicant pairs. In example embodiments, a job-level pCH can be expressed as a percentage that is based on a total, job-level weighted score.

In some embodiments, the C.P. engine utilizes a prediction model for predicting whether a given target candidate account in a professional social network service is relevant to a current job posting submitted by an employer account in the professional social network service. That is, the C.P. engine builds a job applicant quality model to infer whether the attributes of a given job candidate account indicate that the given job candidate account is relevant to the attributes of a job posting submitted by an employer account. Upon inferring that a target candidate account is relevant to a job posting, the C.P. engine tags the target candidate account as a "quality job applicant." The C.P. engine thereby assists the employer account in identifying the best (or most qualified) potential job applicants for the current job posting without having to manually review only those professional social network service member accounts who actually apply to the current job posting.

The C.P. engine may use various prediction modelling techniques to generate the job applicant quality model. For instance, according to various example embodiments, the C.P. engine builds a plurality of job candidate predictor decision trees according to a random forest algorithm. The random forest algorithm can be used in an ensemble learning method for job candidate classification and prediction tasks. For example, the learning method can be a machine learning method that operates by constructing a multitude of decision trees at training time and outputting the class that is the mode of the classes (classification) or mean job candidate prediction (regression) of the individual job candidate predictor decision trees in the random forest. The C.P. engine implements the random forest algorithm over logged interaction data from the professional social network service in order to learn a branch label for each branch of each job candidate predictor decision tree. Each job candidate predictor decision tree corresponds to a pre-defined feature of a job candidate context feature set. For example, a first job candidate predictor decision tree corresponds to a first type of feature in the job candidate context feature set, and a second job candidate predictor decision tree corresponds to a second type of feature in the job candidate context feature set.

The C.P. engine calculates a percentage of all decision tree results that indicate whether the target candidate account is acceptable. If the percentage meets a threshold percentage, the C.P. engine infers that the target candidate account is qualified for the job posting.

It is to be understood that various embodiments further include encoded instructions that comprise operations to generate a user interface(s) and various user interface elements. The user interface and the various user interface elements can be representative of any of the operations, data, decision trees, prediction output, features, accounts, and job postings, as described herein. In addition, the user interface and various user interface elements are generated by the C.P. engine for display on a computing device, a server computing device, a mobile computing device, etc.

According to various exemplary embodiments, the C.P. engine may be used for both offline training (for generating, training, and refining the job AQ model), online inferences (for predicting whether a given job candidate account is relevant to a given job posting), and determining job-level pCH scores.

FIG. 1 is a block diagram illustrating a client-server system 100, in accordance with an example embodiment. A networked system 102 provides server-side functionality via a network 104 (e.g., the Internet or a Wide Area Network (WAN)) to one or more clients. FIG. 1 illustrates, for example, a web client 106 (e.g., a browser) and a programmatic client 108 executing on respective client machines 110 and 112.

An application programming interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102. In some embodiments, the application servers 118 include a candidate predictor (C.P.) engine (e.g., the C.P. engine 206 shown in FIG. 2). However, it is to be understood that the C.P. engine 206 can be implemented by any component(s) of the networked system 102. It is also to be understood that a portion of the C.P. engine 206 can be implemented by any component(s) of the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third-party application 128, executing on a third-party server machine 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications of the networked system 102. In some embodiments, the networked system 102 may comprise functional components of a professional social network.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (e.g., any of the client machines 110, 112 and the third-party server machine 130 may be a mobile device) to access and browse online content, such as any of the online content disclosed herein. A mobile server (e.g., the API server 114) may communicate with the mobile app and the application server(s) 118 in order to make the features of the present disclosure available on the mobile device.

Figure 2:
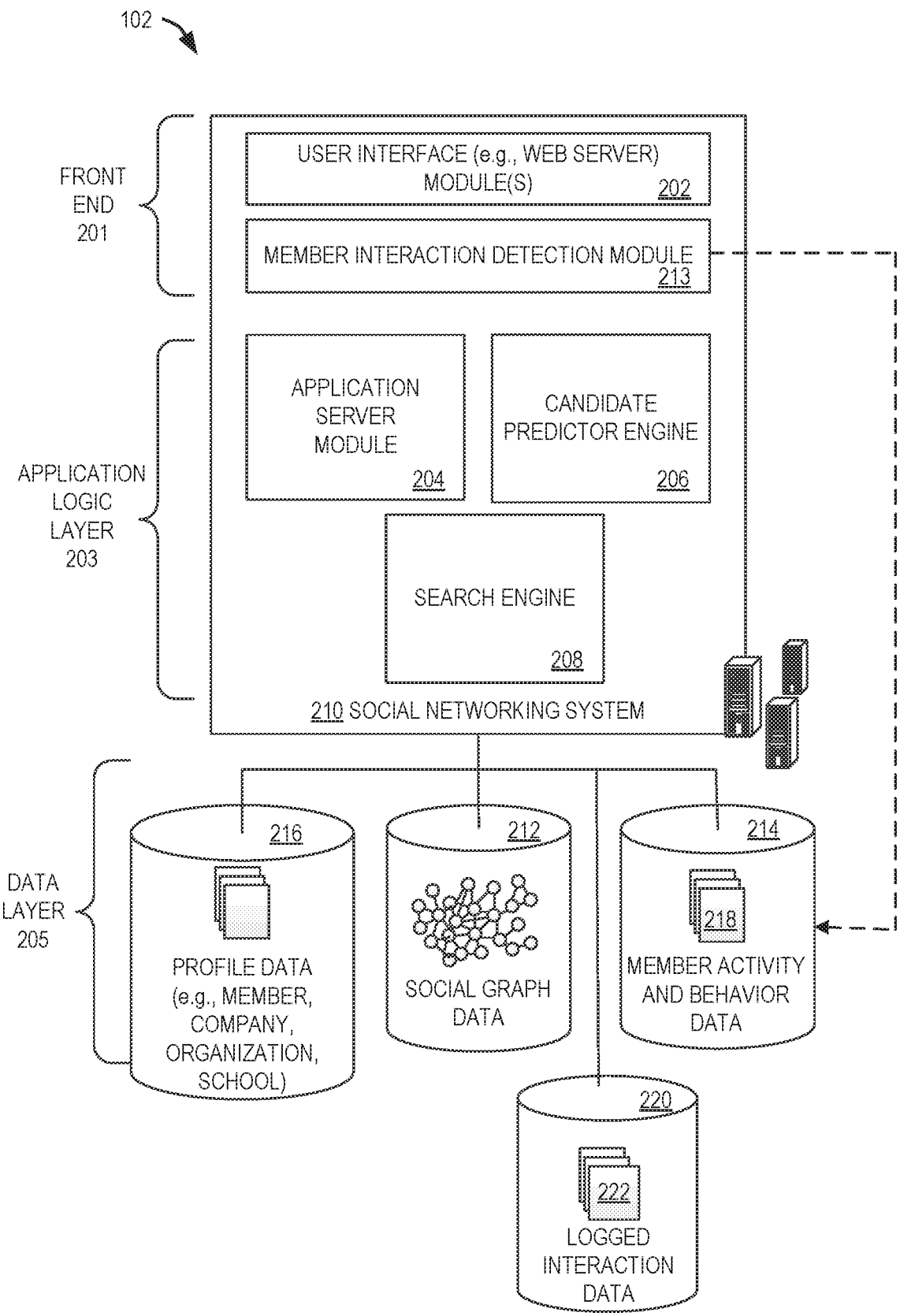
FIG. 2 is a block diagram of functional components of a professional social network, according to various embodiments.

FIG. 2 is a block diagram showing functional components of a professional social network within the networked system 102, in accordance with an example embodiment. In particular, FIG. 2 is a block diagram showing the functional components of a professional social networking service, which can be hosted on a social networking system 210. As shown in FIG. 2, the social networking system 210 can include a data processing module referred to herein as a search engine 208, for use in generating and providing search results for candidate search queries or job search queries. In some embodiments, the search engine 208 may reside on the application server(s) 118 in FIG. 1. However, it is contemplated that other configurations are also within the scope of the present disclosure.

As shown in FIG. 2, the professional social network may be based on a three-tiered architecture, consisting of a front-end layer 201, an application logic layer 203, and a data layer 205. In some embodiments, the modules and systems shown in FIG. 2 represent a set of executable software instructions and the corresponding hardware (e.g., memory and processor) for executing the instructions. To avoid obscuring the inventive subject matter with unnecessary detail, various functional modules and systems that are not germane to conveying an understanding of the inventive subject matter have been omitted from FIG. 2. However, one skilled in the art will readily recognize that various additional functional modules and systems may be used with a professional social network, such as that illustrated in FIG. 2, to facilitate additional functionality that is not specifically described herein. Furthermore, the various functional modules and systems depicted in FIG. 2 may reside on a single server computer, or may be distributed across several server computers in various arrangements. Moreover, although a professional social network is depicted in FIG. 2 as a three-tiered architecture, the inventive subject matter is by no means limited to such architecture. It is contemplated that other types of architecture are within the scope of the present disclosure.

As shown in FIG. 2, in some embodiments, the front-end layer 201 comprises a user interface module (e.g., a web server) 202, which receives requests and inputs from various client-computing devices, and communicates appropriate responses to the requesting client devices. For example, the user interface module(s) 202 may receive requests in the form of Hypertext Transfer Protocol (HTTP) requests, or other web-based API requests. Also, for example, the user interface modules 202 may receive, from client devices, requests for AQ scores for job/applicant pairs and requests for a probability of a confirmed hire for a posted job (i.e., a job-level pCH). The responses to such requests (e.g., AQ scores and job-level pCH values) may be transmitted by the professional social network within the networked system 102 to the requesting client devices for display by the client devices. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 214.

In some embodiments, the application logic layer 203 may include the search engine 208 and various application server modules 204, which, in conjunction with the user interface module(s) 202, generates various user interfaces (e.g., web pages) with data retrieved from various data sources in the data layer 205. In some embodiments, individual application server modules 204 are used to implement the functionality associated with various services and features of the professional social network. For instance, the ability of an organization to establish a presence in a social graph of the social network service, including the ability to establish a customized web page on behalf of an organization, and to publish messages or status updates on behalf of an organization, may be services implemented in independent application server modules 204. Similarly, a variety of other applications or services that are made available to members of the social network service may be embodied in their own application server modules 204.

As shown in FIG. 2, the data layer 205 may include several databases, such as a database for storing profile data 216, including both member profile attribute data and profile attribute data for various organizations. As shown, the profile data 216 may include attribute data for organizations that are associated with members. In the example of FIG. 2, such organizations may include companies (e.g., previous and current employers), educational organizations (e.g., schools a member has attended or worked for), and other organizations (e.g., government organizations and non-profit organizations).

Consistent with some embodiments, when a person initially registers to become a member of the professional social network, the person will be prompted to provide some profile attribute data, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information may be stored, for example, in the profile data 216. Similarly, when a representative of an organization initially registers the organization with the professional social network, the representative may be prompted to provide certain information about the organization. This information may be stored, for example, in the profile data 216, or another database (not shown). In some embodiments, the profile data 216 may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or a seniority level within a particular company. In some embodiments, importing or otherwise accessing data from one or more externally hosted data sources may enhance the profile data 216 for both members and organizations. For instance, with companies in particular, financial data may be imported from one or more external data sources, and made part of a company's profile.

The profile data 216 may also include information regarding settings for members of the professional social network. These settings may comprise various categories, including, but not limited to, privacy and communications. Each category may have its own set of settings that a member may control.

Once registered, a member may invite other members, or be invited by other members, to connect via the professional social network. A "connection" may require a bilateral agreement by the members, such that both members acknowledge the establishment of the connection. Similarly, in some embodiments, a member may elect to "follow" another member. In contrast to establishing a connection, the concept of "following" another member typically is a unilateral operation, and at least in some embodiments, does not require acknowledgement or approval by the member who is being followed. When one member follows another, the member who is following may receive status updates or other messages published by the member being followed, or relating to various activities undertaken by the member being followed. Similarly, when a member follows an organization, the member becomes allowed to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, may be stored and maintained as social graph data within a social graph database 212.

The professional social network may provide a broad range of other applications and services that allow members the opportunity to share and receive information, often customized to the interests of the member. For example, in some embodiments, the professional social network may include a photo sharing application that allows members to upload and share photos with other members. In some embodiments, members may be able to self-organize into groups, or interest groups, organized around subject matter or a topic of interest. In some embodiments, the professional social network may host various job listings providing details of job openings with various organizations.

As members interact with the various applications, services, and content made available via the professional social network, the members' behavior (e.g., content viewed, links or member-interest buttons selected, etc.) may be monitored and information 218 concerning the members' activities and behavior may be stored, for example, as indicated in FIG. 2, by a member activity and behavior database 214. This member activity and behavior database 214 may be used by the search engine 208 to determine search results for a candidate search query. The information 218 can be used as training data and may comprise professional social network activity of member accounts and employer accounts with respect to one or more job postings. Such professional social network activity includes a member account viewing a job posting(s), an employer account viewing a profile of a member account that is a target candidate account, a member account applying to a job posting, an employer account selecting a member account that applied to a job posting for hire, and an employer account not selecting a member account that applied to a job posting for hire. The data layer 205 further includes a logged interaction data repository 220, which includes previous determinations 222 of whether given member accounts are qualified for respective job postings. This logged interaction data repository 220 may also be used by the search engine 208 to determine search results for a candidate search query.

In some embodiments, the professional social network provides an API module via which third-party applications can access various services and data provided by the professional social network. For example, using an API, a third-party application may provide a user interface and logic that enables an authorized representative of an organization to publish messages from a third-party application to a content hosting platform of the professional social network that facilitates presentation of activity or content streams maintained and presented by the professional social network. Such third-party applications may be browser-based applications, or may be operating system-specific. In particular, some third-party applications may reside and execute on one or more mobile devices (e.g., a smartphone, or tablet computing device) having a mobile operating system.

The data in the data layer 205 may be accessed, used, and adjusted by the C.P. engine 206, as will be described in more detail below in conjunction with FIGS. 5-8. Although the C.P. engine 206 is referred to herein as being used in the context of a professional social network, it is contemplated that it may also be employed in the context of any website or online services, including, but not limited to, content-sharing sites (e.g., photo- or video-sharing sites) and any other online services that allow users to have a profile and present themselves or content to other users. Additionally, although features of the present disclosure are referred to herein as being used or presented in the context of a web page, it is contemplated that any user interface view (e.g., a user interface on a mobile device or on desktop software) is within the scope of the present disclosure. It is to be understood that the C.P. engine 206 can be implemented in one or more of the application servers 118.

Although the search engine 208 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 208 facilitates the indexing and searching for content within the social networking service, such as the indexing and searching for data or information contained in the data layer 205, such as profile data 216 (stored, e.g., in a profile database), social graph data (stored, e.g., in the social graph database 212), and member activity and behavior data (stored, e.g., in the member activity and behavior database 214). The search engine 208 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
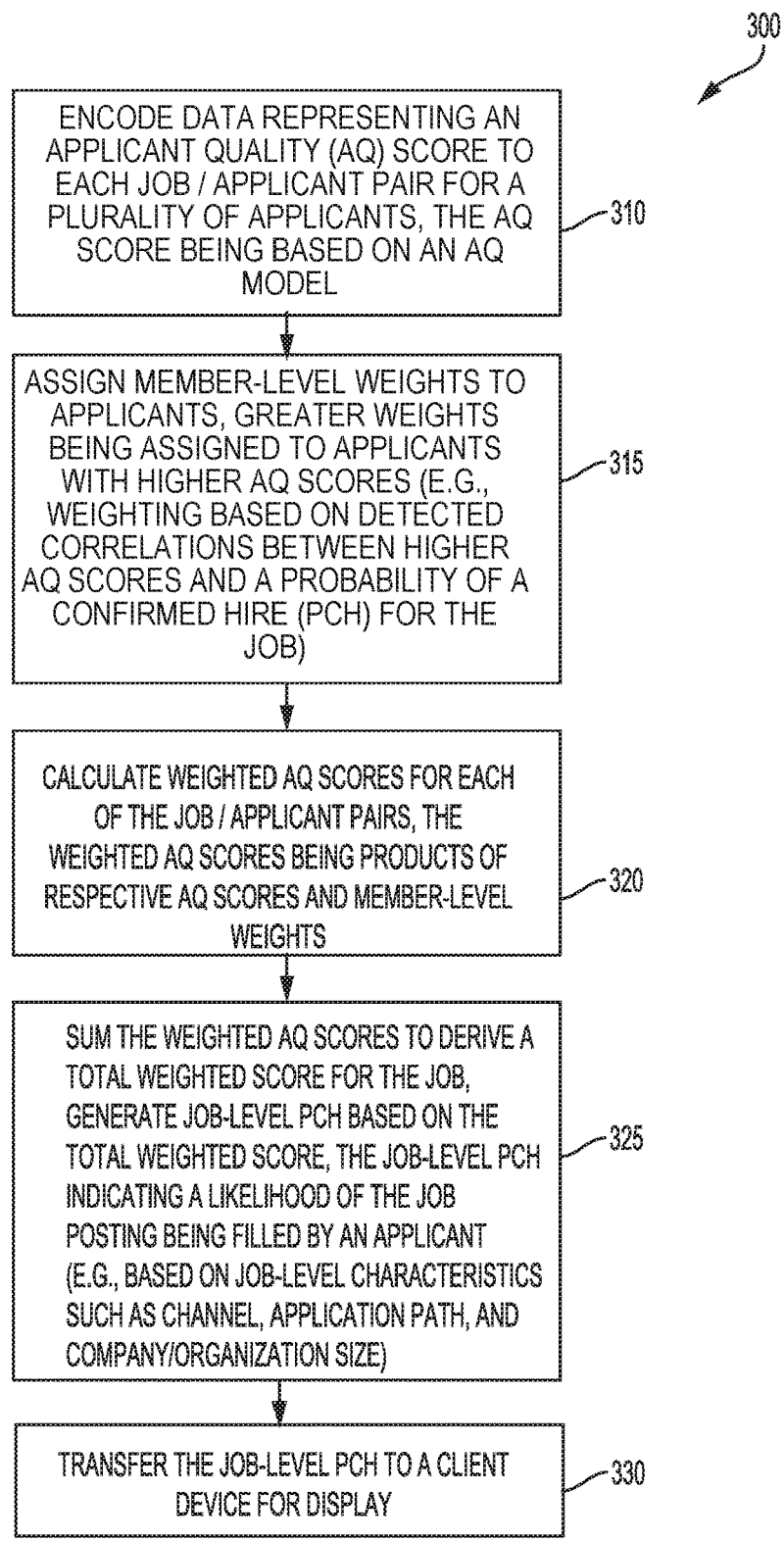
FIG. 3 is a flowchart illustrating an example method, according to various embodiments.

FIG. 3 is a flowchart illustrating an example method 300, according to various embodiments.

At operation 310, data representing an AQ score is encoded. According to some embodiments, the method 300 leverages the fact that an applicant with a relatively high AQ score (e.g., a higher-quality applicant) has a greater likelihood of becoming a confirmed hire. For example, the method 300 may perform operation 310 to determine a weighted AQ score for job/applicant pairs. For instance, the method 300 includes performing operation 310 to assign an AQ score for every job/applicant pair in a group of applicants for a given job posting, where the AQ score is based on an AQ model. According to the AQ model, there is a strong correlation between higher AQ scores encoded at operation 310 and a probability of a confirmed hire for a posted job (i.e., a job-level pCH). In some embodiments, the AQ model is used by operation 310 to assign positive AQ scores to applicants in response to certain events that indicate that the applicant is desirable as a candidate for a job listing, and the AQ model assigns negative AQ scores in response to other events indicating that the applicant is not a good fit for the job listing. For example, the AQ model increases AQ scores of applicants in response to determining that a job poster sends an email to the applicants via a professional social network service. Also, for example, the AQ model increases AQ scores of applicants in response to determining that a job poster or recruiter labels the applicants as being a "good fit" for a job listing. Conversely, the AQ model decreases AQ scores of applicants in response to determining that a job poster labels the applicants as "not a fit" for a job listing. Embodiments leverage the AQ scores encoded at operation 310 to determine weights for pCH scores.

As shown in FIG. 3, operation 310 can comprise assigning an AQ score to each job/applicant pair for a plurality of applicants to a posted job. In some embodiments, the plurality of applicants to the posted job are members of a professional social network service that have applied for the job. In the example of FIG. 3, the AQ score is based on an AQ model. An AQ score for a given applicant of the plurality of applicants indicates whether that applicant is a desirable (e.g., qualified) candidate for the posted job. For example, an AQ score is a measure of whether the attributes of a given job candidate account indicate that the given job candidate account is relevant to the attributes of a job posting submitted by an employer account. I basically want a little more context in this paragraph At operation 315, member-level weights are assigned to applicants with higher AQ scores (i.e., applicants having AQ scores that are greater than other applicants' AQ scores). As shown, operation 315 can comprise assigning weights to applicants based on detected correlations between higher AQ scores and a probability of a confirmed hire (pCH). In an embodiment, the correlations are similar to the correlations depicted in FIG. 9, which is described below.

At operation 320, weighted AQ scores are calculated for each of the job/applicant pairs. As shown, the weighted AQ scores calculated in operation 320 can be calculated by multiplying the respective AQ scores for applicants and the member-level weights assigned in operation 315.

At operation 325, the weighted AQ scores are summed to derive a total weighted score for the job, and a job-level pCH is generated based on the total weighted score. As shown, the job-level pCH indicates a likelihood of the job posting being filled by an applicant (e.g., a confirmed hire qualified for the job posting). FIG. 3 also shows that the job-level pCH can be based on job-level characteristics (e.g., channel, application path, and company/organization size).

At operation 330, the job-level pCH is transmitted to a client device for display. For instance, operation 330 may comprise transmitting the job-level PCH value to a client device (e.g., a client computing device) associated with a job poster or recruiter so that the job-level pCH value can be presented on a display device of the client computing device. In some embodiments, operation 330 comprises transmitting the job-level pCH to a client device that submitted a request for the job-level pCH. That is, operation 330 sends a job-level pCH as a response to the requesting client device for display by that client device. For instance, operation 330 may comprise communicating the job-level pCH to a client device so that the job-level pCH can be presented, in a user interface of the client device, to the job poster who posted the job. Based on the job-level pCH value (i.e., score), the job poster can decide whether to take some action. For example, if the job-level pCH indicates a relatively low probability or low likelihood of the job being filled by a qualified applicant, the job poster may interact with a user interface at the client device to relax (i.e., lower) the job requirements or reduce the desired skills for the job posting.

Figure 4:
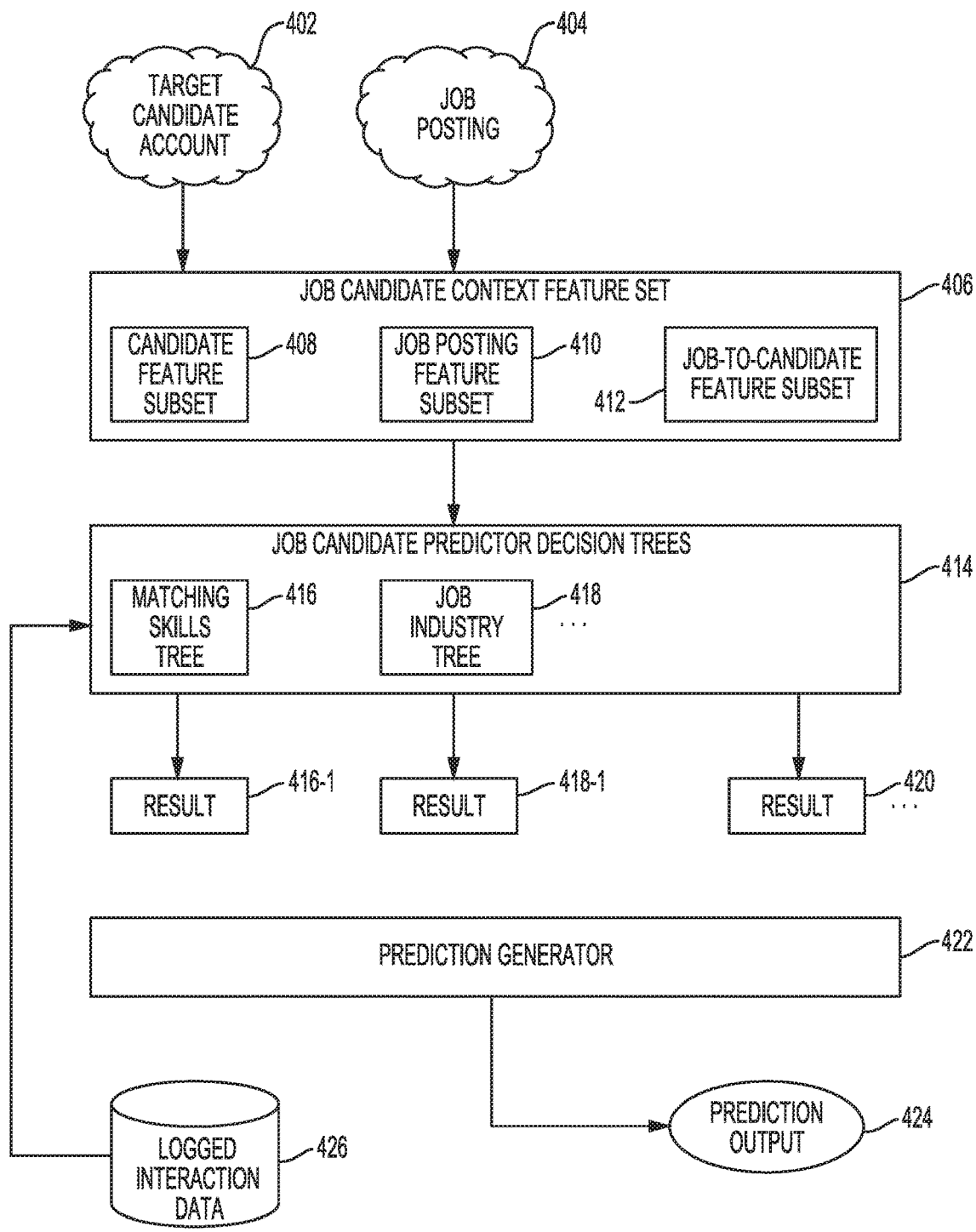
FIG. 4 illustrates a schematic diagram of an exemplary data flow in a candidate predictor engine, according to various embodiments.

FIG. 4 illustrates a schematic diagram of an exemplary data flow in the C.P. engine 206, according to various embodiments.

As shown in FIG. 4, the C.P. engine 206 creates a job candidate context feature set 406 based on the attributes of a target candidate account 402 and attributes of a job posting 404. Such attributes include, as non-limiting examples, education, job function, job industry, skills, years of professional experience, job title, job location, size of company, and job seniority.

Each feature in the Job Candidate Feature Context Set 406 is pre-defined as being germane in predicting a relevance between a give candidate account and a given job posting. Such features can also be based on one or more of the aforementioned account attributes: education, job function, job industry, skills, years of professional experience, job title, job location, size of organization/company, and job seniority.

A candidate feature subset 408 includes those attribute types of the target candidate account 402 that have been pre-defined as features of the job applicant quality model implemented by the C.P. engine 206. A job posting feature subset 410 includes those attributes types of the job posting 404 that have been pre-defined as features of the job applicant quality model.

In addition, particular differences between the attributes of the target candidate account 402 and the job posting 404 are also pre-defined as being germane to predicting a relevance between a given candidate account and a given job posting. For a job-to-candidate feature subset 412, the C.P. engine 206 compares attributes between the target candidate account 402 and the job posting 404 to generate comparison features. For example, the C.P. engine 206 compares the skills of the target candidate account 402 and the skills required by the job posting 404 to generate skills comparison features for the job-to-candidate feature subset 412. Such skills comparison features can be a percentage of matching skills and a total number of matching skills.

In another example, the C.P. engine 206 compares the years of professional experience attribute of the target candidate account 402 and the years of professional experience attribute required by the job posting 404 to generate a years of experience comparison feature for the job-to-candidate feature subset 412. Such a years of experience comparison feature can be a difference between the target candidate account's 402 years of professional experience and the years of professional experience required by the job posting 404.

The C.P. engine 206 filters features from the candidate feature subset 408, the job posting feature subset 410, and the job-to-candidate feature subset 412 through a plurality of job candidate predictor decision trees 414. In some embodiments, the job candidate predictor decision trees 414 are decision trees of a random forest model. Such a random forest model can be the above-described job AQ model used to produce AQ scores. The C.P. engine 206 builds the job candidate predictor decision trees 414 based on logged interaction data 426 (e.g., the logged interaction data 220 described above with reference to FIG. 2), and branch labels for the branches of each tree 416, 418, . . . are learned by applying a random forest algorithm to the logged interaction data 426. In certain embodiments, the logged interaction data 426 is stored on a storage device that is accessible by the C.P. engine 206.

The logged interaction data 426 includes a plurality of previous determinations (e.g., the previous determinations 222 described above with reference to FIG. 2) from respective employer accounts about whether various job candidate accounts are qualified for one or more job postings. The logged interaction data 426 is used by the C.P. engine 206 as training data in order to learn relationships between candidate features and job posting features that are indicative of whether a given candidate account will be qualified for a given job posting. The C.P. engine 206 creates the plurality of job candidate predictor decision trees 414 and learns branch labels for each branch of each tree 416, 418, . . . as a result of applying the random forest algorithm to the logged interaction data 426. In additional or alternative embodiments, the C.P. engine 206 is further configured to store, on a storage device, encoded data representing AQ scores for each job/applicant pair for a plurality of applicants to the job posting 404. For example, the C.P. engine 206 can encode data representing an AQ score for each job applicant (e.g., target candidate account 402)/job posting (e.g., job posting 404) pair for a plurality of applicants to the job posting 404, where the AQ score is based on an AQ model.

This encoded data representing respective AQ scores of target candidate accounts 402 can then be stored on a storage device, such as, for example, a storage device used to store the logged interaction data 426.

Each tree 416, 418, . . . corresponds to a particular feature in the job candidate context feature set 406. For example, a matching skills tree 416 has a root branch label that corresponds to a skills comparison feature from the job-to-candidate feature subset 412. Such a skills comparison feature can be the percentage of matching skills. According to another example, a job industry tree 418 has a root branch label that corresponds with an industry comparison feature from the job-to-candidate feature subset 412. Such an industry comparison feature can be a determination of whether the target candidate account 402 and the job posting 404 share a threshold amount of job industry descriptors. It is to be understood that various job candidate predictor decision trees 414 can correspond to other features, such as job function, difference in years of experience, job country location, job company size, job seniority, current job industry, and job region. Each tree 416, 418, . . . produces a result 416-1, 418-1 . . . , 420, . . . . Each result 416-1, 418-1, . . . , 420, . . . is a positive determination ("1") or negative determination ("0") returned by the corresponding tree 416, 418, . . . . A prediction generator 422 of the C.P. engine 206 receives all the results 416-1, 418-1, . . . , 420, . . . from all the trees 416, 418, . . . and calculates whether at least a certain percentage of the results 416-1, 418-1, . . . , 420, . . . are positive determinations ("1"). If a certain percentage of the results 416-1, 418-1, . . . , 420, . . . are positive determinations ("1"), a prediction output 424 indicates that the target candidate account 402 is qualified for the job posting 404. If a certain percentage of the results 416-1, 418-1, . . . , 420, . . . are negative determinations ("0"), the prediction output 424 indicates that the target candidate account 402 is not qualified for the job posting 404. In certain embodiments, the prediction output 424 is an AQ score for the target candidate account 402. According to these embodiments, the prediction output 424 is an AQ score representing an inference of whether a target candidate account 402 is qualified for a particular job posting, and the prediction output 402 is based on each result returned from each job candidate predictor decision tree.

Figure 5:
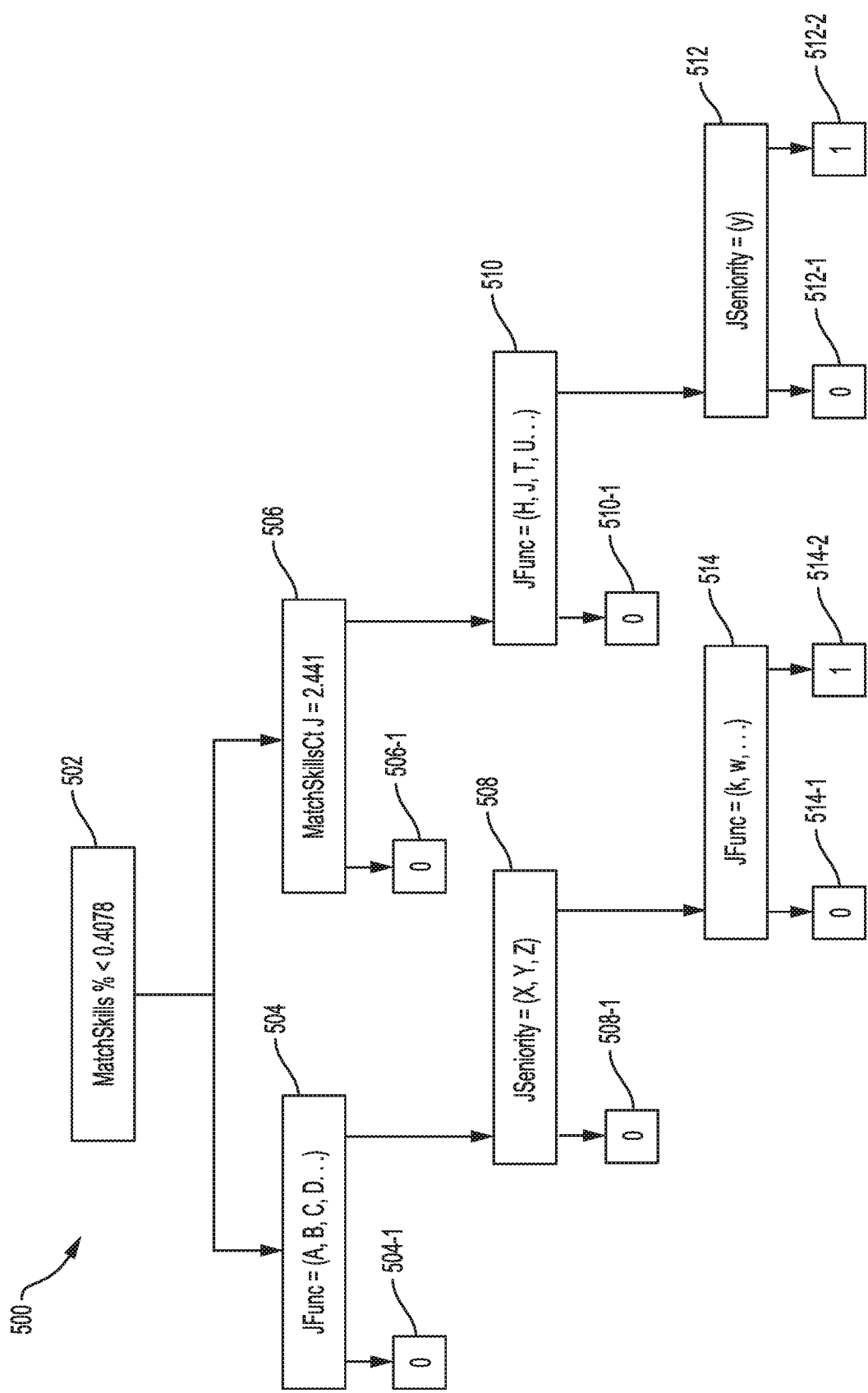
FIG. 5 illustrates a block diagram of a job candidate predictor decision tree for a matching skills feature, according to various embodiments.

FIG. 5 illustrates a block diagram of a job candidate predictor decision tree 500 for a matching skills feature, according to various embodiments. Certain embodiments overcome technical problems associated with assembly and organization of logged interaction data 426 by using the job candidate predictor decision tree 500 shown in FIG. 5. For example, by using a random forest algorithm that is trained using the logged interaction data 426 as training data, branch labels 502, 504, 506, 508, 510, 512, 514 of the job candidate predictor decision tree 500 are learned. In this way, the skills tree 416 can be used to determine percentages of matching skills more quickly than with traditional techniques.

The job candidate predictor decision tree 500 of FIG. 5 represents the matching skills tree 416 in FIG. 4. The matching skills tree 416 has one or more branch labels 502, 504, 506, 508, 510, 512, 514 that are learned by using the logged interaction data 426 as training data for a random forest algorithm. The matching skills tree 416 corresponds to a skills comparison feature, such as a percentage of matching skills.

The C.P. engine 206 accesses a skills comparison feature, such as the percentage of matching skills between the target candidate account 402 and the job posting 404, from the job-to-candidate feature subset 412. The root branch label 502 requires a learned matching skills threshold of just under 41% (40.78%). If the skills comparison feature indicates that the percentage of matching skills between the target candidate account 402 and the job posting 404 is less than 40.78%, the C.P. engine 206 accesses branch label 504.

Branch label 504 requires that the job posting 404 list (or relate to) one or more job functions (A, B, C, D, . . . ). The job functions listed at branch label 504 are learned from the logged interaction data 426. If the job posting 404 does not list (or relate to) any of the job functions (A, B, C, D, . . . ) required at branch label 504, the matching skills tree 416 returns a negative determination 504-1 indicating that the target candidate account 402 is not qualified. If the job posting 404 does list (or relate to) any of the job functions (A, B, C, D, . . . ) required at branch label 504, the C.P. engine 206 accesses branch label 508.

Branch label 508 requires that the job posting 404 list (or relate to) one or more levels of professional seniority (X, Y, Z). If the job posting 404 does not list (or relate to) one or more levels of professional seniority (X, Y, Z), the matching skills tree 416 returns a negative determination 508-1 indicating that the target candidate account 402 is not qualified. If the job posting 404 does list (or relate to) one or more levels of professional seniority (X, Y, Z), the C.P. engine 206 accesses branch label 514.

Branch label 514 requires that the job posting 404 list (or relate to) one or more different job functions (k, w, . . . ) from those required at branch label 504. The job functions listed at branch label 514 are learned from the logged interaction data 426. If the job posting 404 does not list (or relate to) any of the job functions (k, w, . . . ) required at branch label 514, the matching skills tree 416 returns a negative determination 514-1 indicating that the target candidate account 402 is not qualified. If the job posting 404 does list (or relate to) any of the job functions (k, w, . . . ) required at branch label 514, the matching skills tree 416 returns a positive determination 514-2 indicating that the target candidate account 402 is qualified.

Returning to the root branch label 502, if the percentage of matching skills is greater than 40.78%, the C.P. engine 206 accesses branch label 506. Branch label 506 includes a learned matching skills count between a candidate account and a job posting. The learned matching skills count is 2.441. If the number of matching skills between the target candidate account 402 and the job posting 404 is less than 2.441, the matching skills tree 416 returns a negative determination 506-1 indicating that the target candidate account 402 is not qualified.

If the number of matching skills between the target candidate account 402 and the job posting 404 is greater than 2.441, the C.P. engine 206 accesses branch label 510. Branch label 510 requires that the job posting 404 list (or relate to) one or more job functions (H, J, T, U, . . . ). The job functions listed at branch label 510 are learned from the logged interaction data 426. If the job posting 404 does not list (or relate to) any of the job functions (H, J, T, U, . . . ) required at branch label 510, the matching skills tree 416 returns a negative determination 510-1 indicating that the target candidate account 402 is not qualified. If the job posting 404 does list (or relate to) any of the job functions (H, J, T, U, . . . ) required at branch label 510, the C.P. engine 206 accesses branch label 512.

Branch label 512 requires that the job posting 404 list (or relate to) one or more levels of professional seniority (y). If the job posting 404 does not list (or relate to) one or more levels of professional seniority (y), the matching skills tree 416 returns a negative determination 512-1 indicating that the target candidate account 402 is not qualified. If the job posting 404 does list (or relate to) one or more levels of professional seniority (y), the C.P. engine 206 returns a positive determination 512-2 indicating that the target candidate account 402 is qualified.

Figure 6:
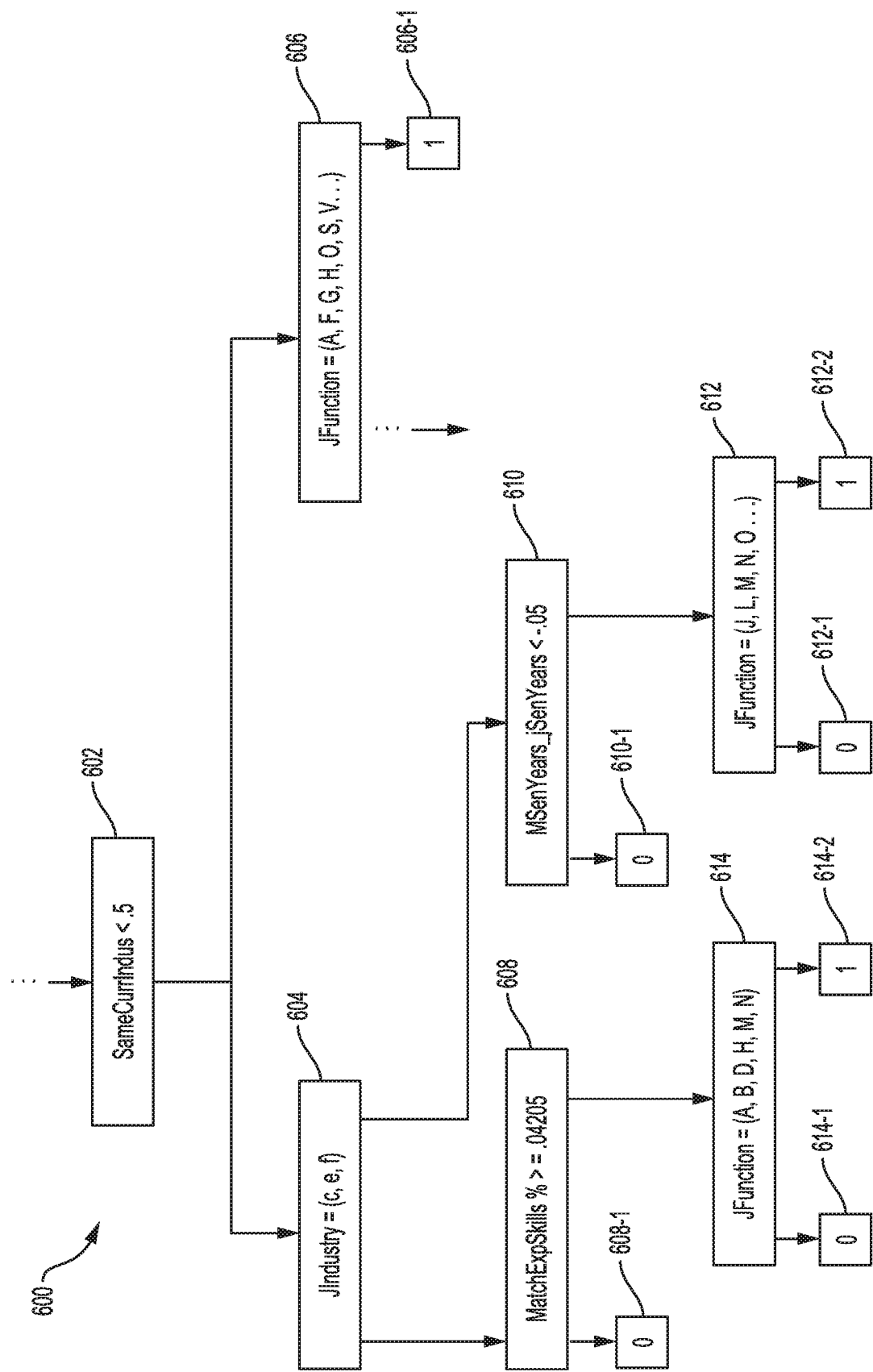
FIG. 6 illustrates a block diagram of a job candidate predictor decision tree for a job industry feature, according to various embodiments.

FIG. 6 illustrates a block diagram of a job candidate predictor decision tree 600 for a job industry feature, according to various embodiments.

Some embodiments overcome technical problems associated with assembling and organizing the logged interaction data 426 by using the job candidate predictor decision tree 600 shown in FIG. 6. For example, by using a random forest algorithm that is trained using the logged interaction data 426 as training data, branch labels 602, 604, 606, 608, 610, 612, 614 of the job candidate predictor decision tree 600 can be learned. In this way, the job industry tree 418 is used to make comparisons of current industry features from the job-to-candidate feature subset 412 more quickly than with traditional techniques.

The job candidate predictor decision tree 600 of FIG. 6 represents a portion of the job industry tree 418 in FIG. 4. The job industry tree 418 has one or more branch labels 602, 604, 606, 608, 610, 612, 614 that are learned by using the logged interaction data 426 as training data for a random forest algorithm. The job industry tree 418 corresponds to a current industry comparison feature from the job-to-candidate feature subset 412.

The C.P. engine 206 accesses branch label 602 and determines whether job industry features in the candidate feature subset 408 are the same as the job industry features in the job posting feature subset 410 (e.g., within a threshold of 0.5 in the example of FIG. 6). If the job industry features are the same, the C.P. engine 206 accesses branch label 604. Branch label 604 requires that the job posting 404 list (or relate to) one or more job industries (c, e, f). The job industries listed at branch label 604 are learned from the logged interaction data 426. If the job posting 404 does not list (or relate to) any of the job industries (c, e, f) required at branch label 604, the C.P. engine 206 accesses branch label 608.

Branch label 608 requires a learned matching skills threshold of greater than or equal to 4.205%. If the skills comparison feature indicates that the percentage of matching skills between the target candidate account 402 and the job posting 404 is less than 4.2%, the job industry tree 418 returns a negative determination 608-1 indicating that the target candidate account 402 is not qualified. If the skills comparison feature indicates that the percentage of matching skills between the target candidate account 402 and the job posting 404 is greater than or equal to 4.2%, the C.P. engine 206 accesses branch label 614.

Branch label 614 requires that the job posting 404 list (or relate to) one or more different job functions (A, B, D, H, M, N). The job functions listed at branch label 614 are learned from the logged interaction data 426. If the job posting 404 does not list (or relate to) any of the job functions (A, B, D, H, M, N) required at branch label 614, the job industry tree 418 returns a negative determination 614-1 indicating that the target candidate account 402 is not qualified. If the job posting 404 does list (or relate to) any of the job functions (A, B, D, H, M, N) required at branch label 614, the job industry tree 418 returns a positive determination 614-2 indicating that the target candidate account 402 is qualified.

Returning to branch label 604, if the job posting 404 does list (or relate to) any of the job industries (c, e, f) required at branch label 604, the C.P. engine 206 accesses branch label 610. Branch label 610 requires the use of a comparison feature from the job-to-candidate feature subset 412 that represents a difference in years of professional experience between the target candidate account 402 and the job posting 404. Branch label 610 represents a requirement that the target candidate account's 402 years of professional experience be greater than the years of professional experience required by the job posting 404 minus 0.05 years (i.e., job posting required years of professional experience—0.5). If the requirement of branch label 610 is not satisfied, the job industry tree 418 returns a negative determination 610-1 indicating that the target candidate account 402 is not qualified. If the requirement of branch label 610 is satisfied, the C.P. engine 206 accesses branch label 612.

Branch label 612 requires that the job posting 404 list (or relate to) one or more job functions (J, L, M, N, O, . . . ). The job functions listed at branch label 612 are learned from the logged interaction data 426. If the job posting 404 does not list (or relate to) any of the job functions (J, L, M, N, O, . . . ) required at branch label 612, the job industry tree 418 returns a negative determination 612-1 indicating that the target candidate account 402 is not qualified. If the job posting 404 does list (or relate to) any of the job functions (J, L, M, N, O, . . . ) required at branch label 612, the job industry tree 418 returns a positive determination 612-2 indicating that the target candidate account 402 is qualified.

Returning to branch label 602, if the job industry features are not the same, the C.P. engine 206 accesses branch label 606. Branch label 606 requires that the job posting 404 list (or relate to) one or more job functions (A, F, G, H, O, S, V, . . . ). The job functions listed at branch label 606 are learned from the logged interaction data 426. If the job posting 404 does list (or relate to) any of the job functions (A, F, G, H, O, S, V, . . . ), the job industry tree 418 returns a positive determination 606-1 indicating that the target candidate account 402 is qualified.

Figure 7:
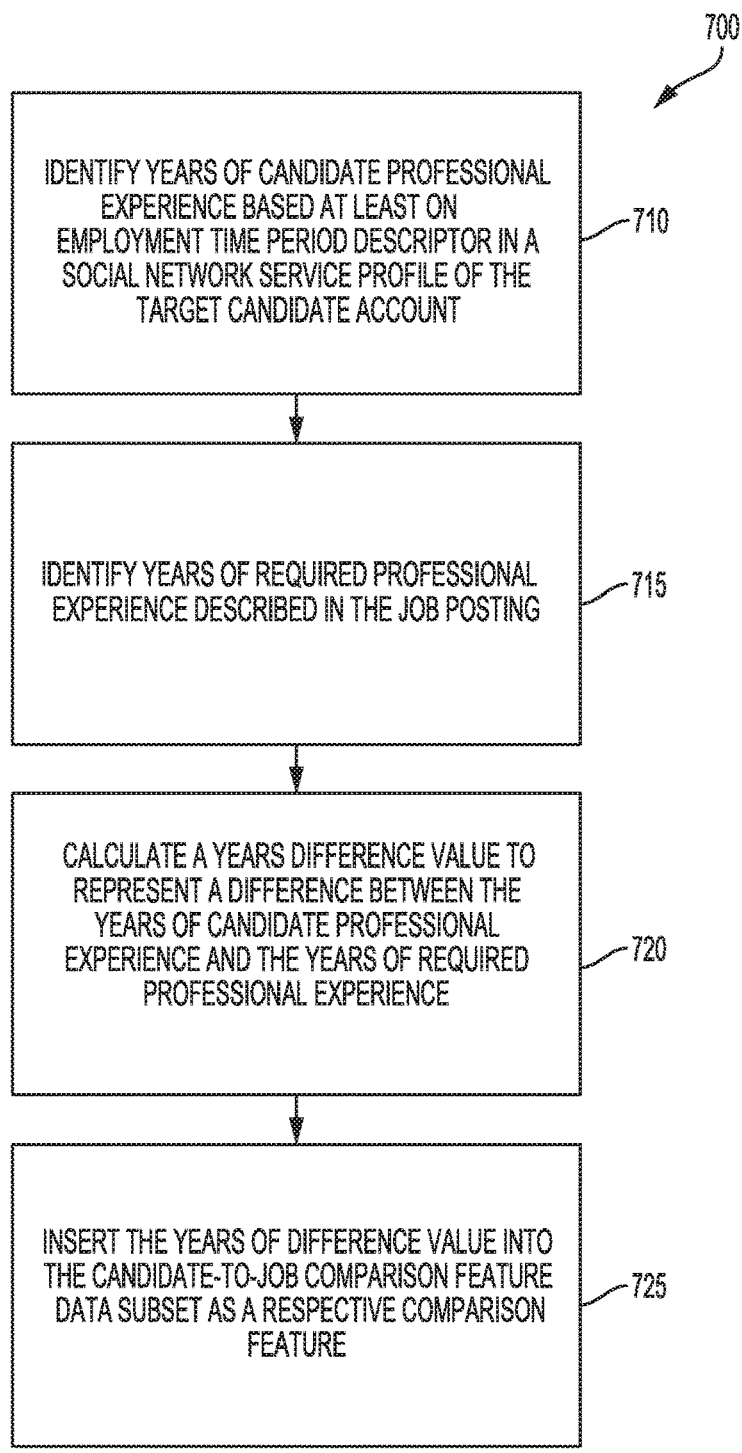
FIG. 7 is a flowchart illustrating an example method for determining a years difference value as a comparison feature in a job-to-candidate feature subset, according to various embodiments.

FIG. 7 is a flowchart illustrating an example method 700 for determining a years difference value as a comparison feature in a job-to-candidate feature subset, according to various embodiments.

As shown in FIG. 4, the C.P. engine 206 generates subsets 408, 410, 412 of features for the job candidate context feature set 406. The subsets 408, 410, 412 of features are based on attributes of the target candidate account 402 and the job posting 404. A feature is an attribute, attribute value, or relationship between attributes, that is pre-defined in the job applicant quality model as being germane in predicting whether a given candidate account is qualified for a given job posting.

The job-to-candidate feature subset 412 includes comparison features. A comparison feature can be, for example, a value generated via a comparison of the target candidate account's years of professional experience and the years of professional experience required by the job posting 404.

At operation 710, the C.P. engine 206 identifies years of candidate professional experience based at least on an employment time period descriptor in a social network service profile of the target candidate account 402. For example, the C.P. engine 206 accesses a data location(s) in the social network service representative of the attribute(s) of the target candidate account 402. The C.P. engine 206 identifies a descriptor(s) in the accessed data location(s) that corresponds with years of professional experience of the target candidate account 402. The C.P. engine 206 obtains a first value of the years of the candidate's professional experience from the accessed data location(s).

At operation 715, the C.P. engine 206 identifies a number of years of required professional experience described in the job posting. For example, the C.P. engine 206 accesses a data location(s) in the social network service representative of the attribute(s) of the job posting 404. The C.P. engine 206 identifies a descriptor(s) in the accessed data location(s) that corresponds with the years of professional experience required by the job posting 404. The C.P. engine 206 obtains a second value of the years of professional experience required by the job posting 404 from the accessed data location(s).

At operation 720, the C.P. engine 206 calculates a years difference value to represent a difference between the years of candidate professional experience and the years of required professional experience. For example, the C.P. engine 206 calculates a difference between the first value and the second value to generate a years difference value.

At operation 725, the C.P. engine 206 inserts the years difference value into the candidate-to-job comparison feature data subset (e.g., the job-to-candidate feature subset 412) as a respective comparison feature. For example, the C.P. engine 206 identifies a data location(s) for a first comparison feature representative of a difference in years of professional experience. The C.P. engine 206 inserts the calculated years difference value in the data location(s) for the first comparison feature.

In another embodiment, the C.P. engine 206 identifies each skill descriptor in a social network service profile of the target candidate account 402. For example, the C.P. engine 206 accesses a data location(s) in the social network service representative of the attribute(s) of the target candidate account 402. The C.P. engine 206 identifies a descriptor(s) in the accessed data location(s) that corresponds with a candidate skill(s) of the target candidate account 402.

The C.P. engine 206 identifies each skill descriptor described in the job posting 404. For example, the C.P. engine 206 accesses a data location(s) in the social network service representative of the attribute(s) of the job posting 404. The C.P. engine 206 identifies a descriptor(s) in the accessed data location(s) that corresponds with a job skill(s) required by the job posting 404.

The C.P. engine 206 calculates a skill match value to represent a percentage of matching skill descriptors between the target candidate account's 402 skill descriptors and each job posting's 404 skill descriptors. For example, the C.P. engine 206 identifies one or more matching skills between the candidate skill(s) and the job skill(s). The C.P. engine 206 inserts the skill match value into the candidate-to-job comparison feature data subset (e.g., job-to-candidate feature subset 412) as a respective comparison feature.

Figure 8:
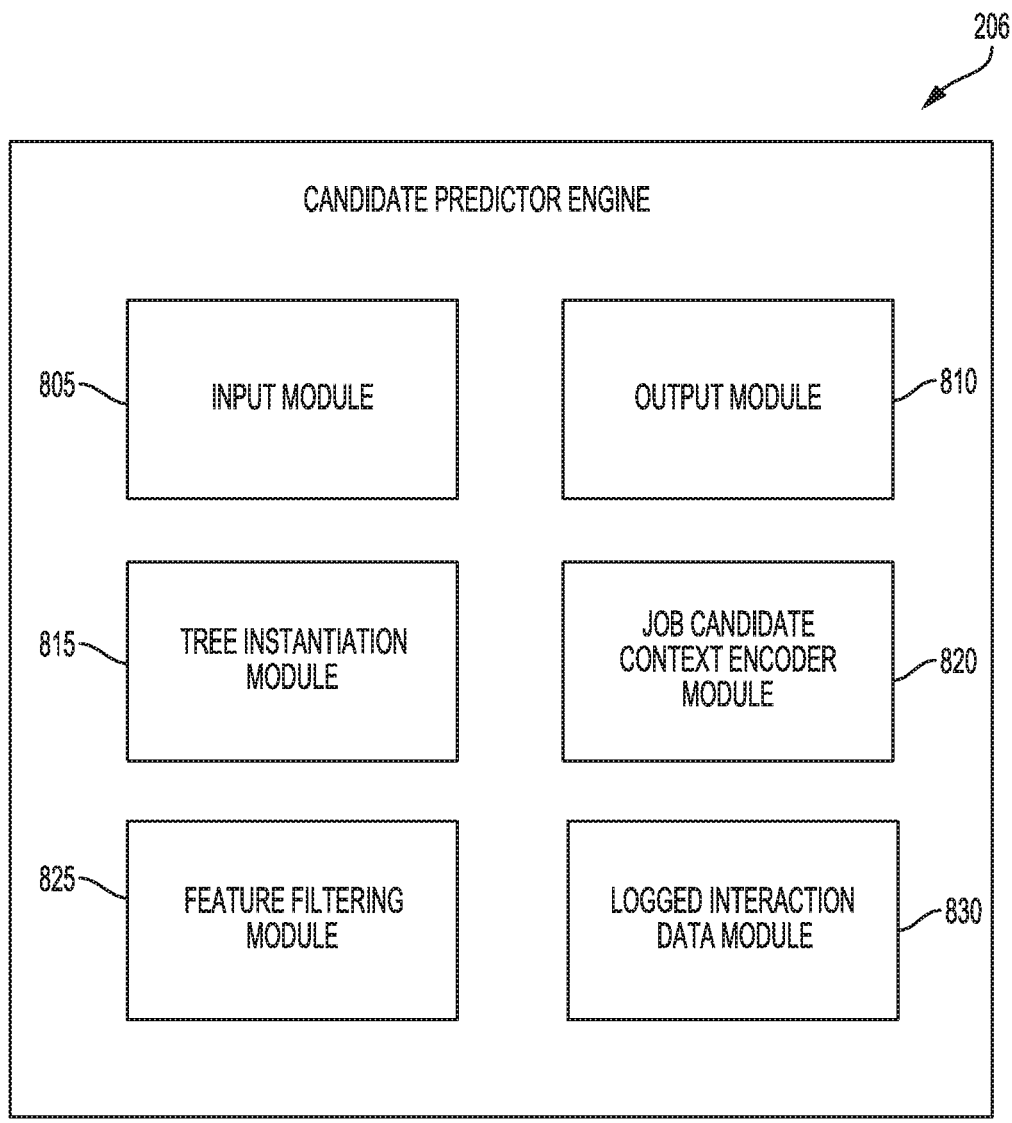
FIG. 8 is a block diagram showing example components of a candidate predictor engine, according to some embodiments.

FIG. 8 is a block diagram showing example components of a candidate predictor (C.P.) engine 206, according to some embodiments. As shown in FIG. 8, the C.P. engine 206 includes an input module 805, an output module 810, a tree instantiation module 815, a job candidate context encoder module 820, a feature filtering module 825, and a logged interaction data module 830.

The input module 805 is a hardware-implemented module that controls, manages, and stores information related to any inputs from one or more components of the networked system 102 as illustrated in FIG. 1 and FIG. 2. In various embodiments, the inputs include an attribute(s) of a member account(s) and an attribute(s) of a job posting(s). Inputs can also include logged interaction data comprising previous determinations of whether a candidate member account is or is not qualified for a particular job posting.

The output module 810 is a hardware-implemented module that controls, manages, and stores information related to any outputs to one or more components of the networked system 102 as illustrated in FIG. 1 and FIG. 2. In some embodiments, the output is prediction output representing an inference of whether a target candidate account is qualified for a particular job posting. The prediction output is based on each result returned from each job candidate predictor decision tree.

The tree instantiation module 815 is a hardware-implemented module which manages, controls, stores, and accesses information related to building one or more job candidate predictor decision trees. The tree instantiation module 815 builds a job candidate predictor decision tree for each type of feature in a job candidate context feature set. Each branch of each job candidate predictor decision tree comprises a label learned from executing a random forest algorithm with training data. The training data is based on the logged interaction data comprising previous determinations of whether a candidate member account is or is not qualified for a particular job posting.

The job candidate context encoder module 820 is a hardware-implemented module which manages, controls, stores, and accesses information related to encoding a job candidate context feature set. The job candidate context encoder module 820 accesses attributes of a target candidate account and a job posting in order to encode the job candidate context feature set. The job candidate context feature set includes features based on the attributes of a target candidate account and a job posting. Each feature is pre-defined and germane to predicting whether a given candidate account is relevant to a given job posting. The feature filtering module 825 is a hardware-implemented module which manages, controls, stores, and accesses information related to filtering a feature from the job candidate context feature set through a particular job candidate predictor decision tree. Each job candidate predictor decision tree corresponds to a type of feature in the job candidate context feature set. The feature filtering module 825 filters each type of feature in the job candidate context feature set through the job candidate predictor decision tree that corresponds to the same type of feature. Each job candidate predictor decision tree returns either a positive determination or a negative determination of whether the target candidate account is a qualified applicant.

The logged interaction data module 830 is a hardware-implemented module which manages, controls, stores, and accesses information related to generating, updating, and storing training data. The logged interaction data module 830 collects and stores explicit determinations of whether a candidate member account is or is not qualified for a particular job posting. Each determination is received from an employer account that has submitted a job posting. Each determination represents the employer account's actual decision of whether the attributes of a member account are relevant to a given job posting. The logged interaction data module 830 includes the attributes of the member account, the attributes of the given job posting, and the employer account's determination of whether or not the member account is qualified.

FIG. 9 is a chart 900 depicting correlations between AQ scores 904 and member pCH percentages 902, according to some embodiments. In particular, FIG. 9 shows that there is a strong correlation 906 between the AQ scores 904 and the member pCH percentages 902. In an embodiment, the member pCH percentages 902 are pCH scores for members of a professional social network service.

Figure 10:
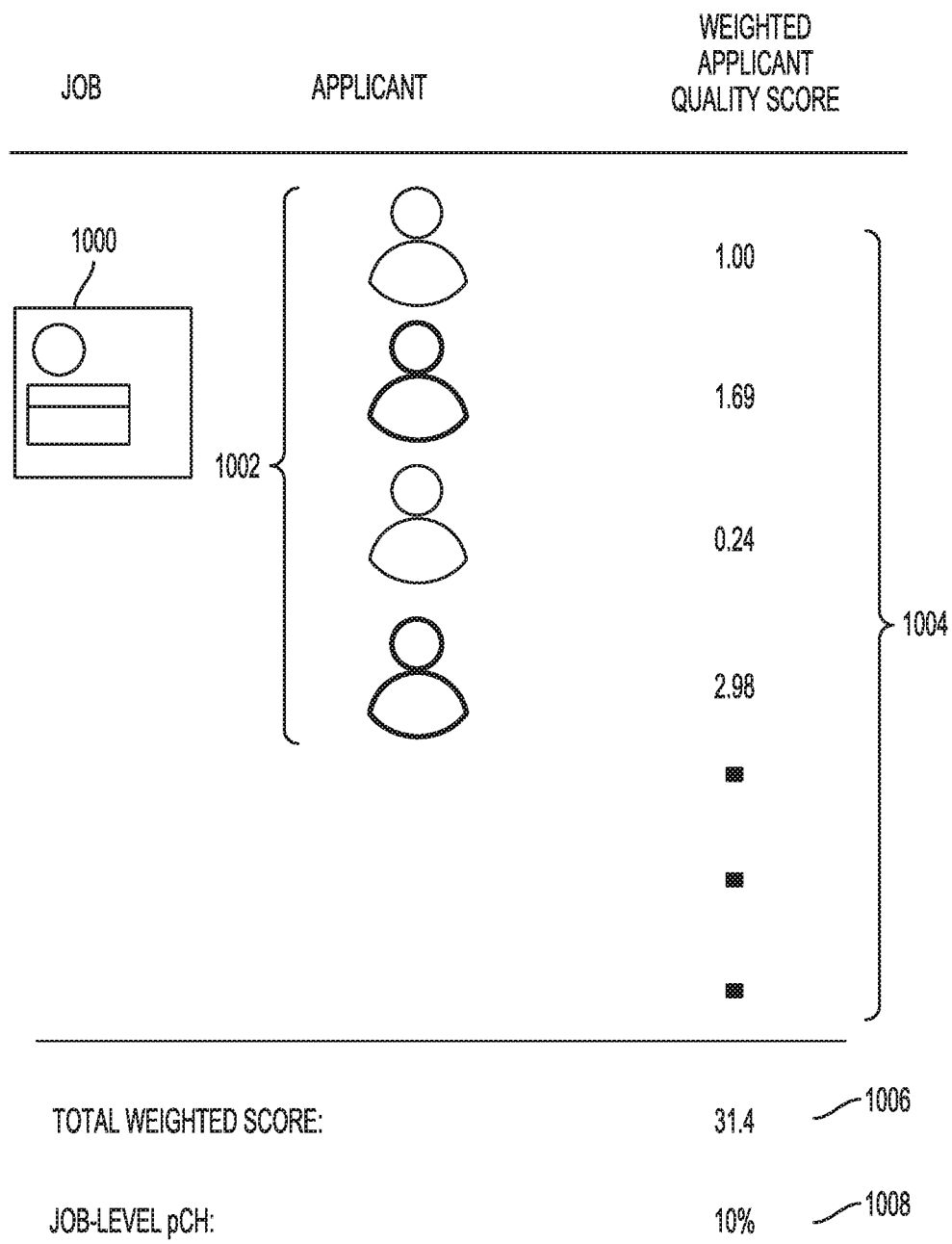
FIG. 10 illustrates weighted AQ scores of applicants for a given job, and a job-level pCH for the job based on a total weighted AQ score for the applicants, according to some embodiments.

FIG. 10 illustrates weighted AQ scores 1004 of applicants 1002 for a given job 1000. As shown, a high-quality applicant 1010 can be identified based on the weighted AQ scores 1004, and a job-level pCH 1008 for the job is based on a total weighted AQ score 1006 for the applicants.

Figure 11:
FIG. 11 illustrates final weighted AQ scores of applicants for a given job based on AQ scores and member-level pCH weightings, and a job-level pCH for the job based on a total final weighted AQ score for the applicants, according to some embodiments.

FIG. 11 illustrates a method for calculating final weighted AQ scores 1104 of applicants 1102 for a given job 1100 based on multiplying AQ scores by member-level pCH weights to identify a high quality applicant 1110. As shown, a job-level pCH 1108 for the job 1100 can be based on a total final weighted AQ score 1106 representing a sum of the weighted AQ scores 1104 of the applicants 1102.

Figure 12:
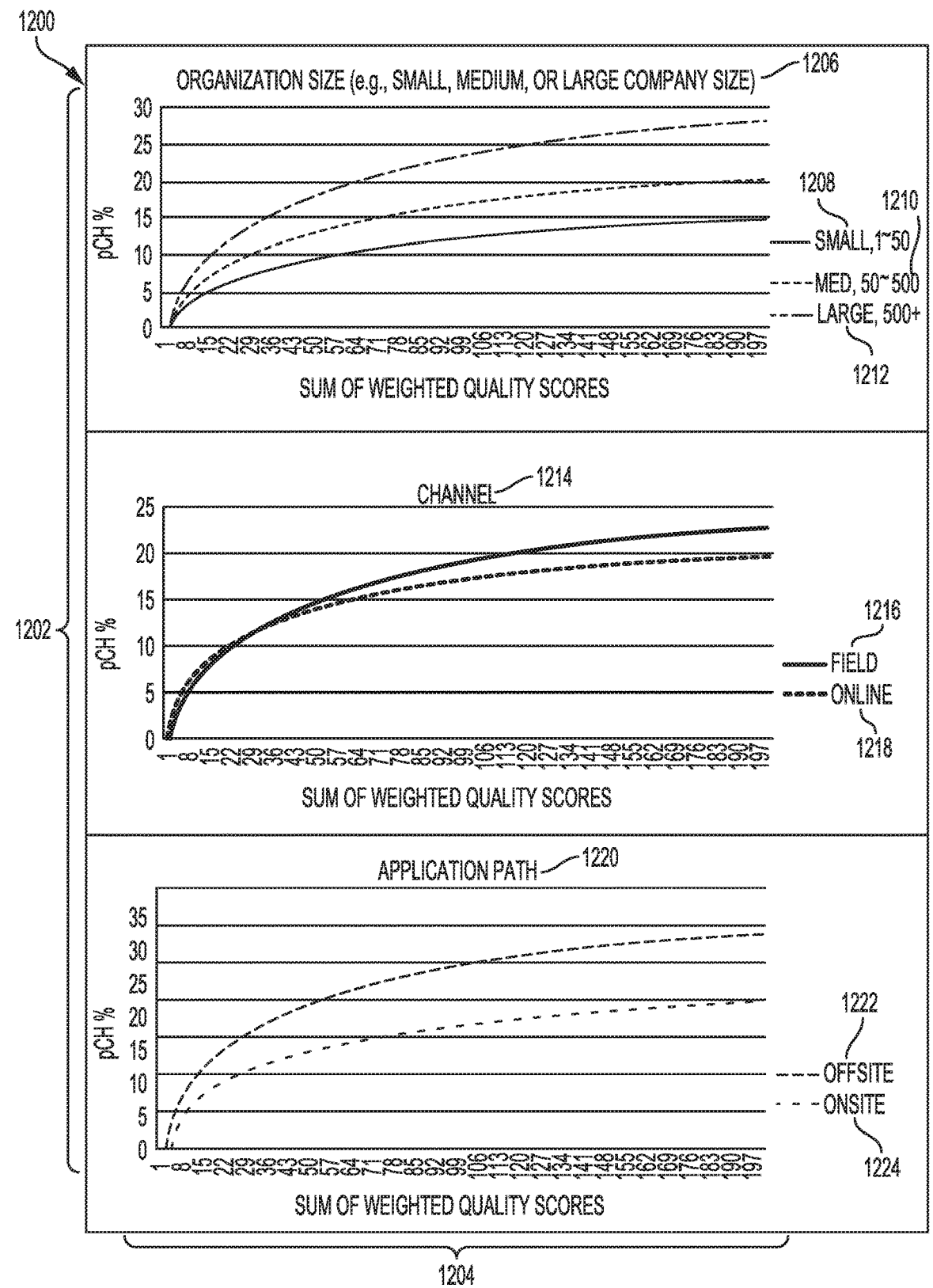
FIG. 12 provides charts depicting correlations between job-level pCH scores and dimensions for organization size, channel, and application path, according to some embodiments.

FIG. 12 provides charts 1200 depicting correlations between job-level pCH percentages 1202 and dimensions for organization size 1206, channel 1214, and application path 1220, according to some embodiments. As shown, a sum of weighted quality scores 1204 can be correlated to the job-level pCH percentages 1202 for each of the dimensions.

For example, FIG. 12 depicts correlations between the job-level pCH percentages 1202 and dimensions for organization size 1206 representing small organizations 1208 (e.g., 1-50 employees in the example of FIG. 12), medium organizations 1210 (e.g., 50-500 employees), and large organizations (e.g., companies with more than 500 employees).

Also, for example, FIG. 12 depicts correlations between the job-level pCH percentages 1202 and dimensions for channel 1214 representing field channels 1216 and online channels 1218.

Further, for example, FIG. 12 depicts correlations between the job-level pCH percentages 1202 and dimensions for application path 1220 representing offsite applications 1222 and onsite applications 1224.

Figure 13:
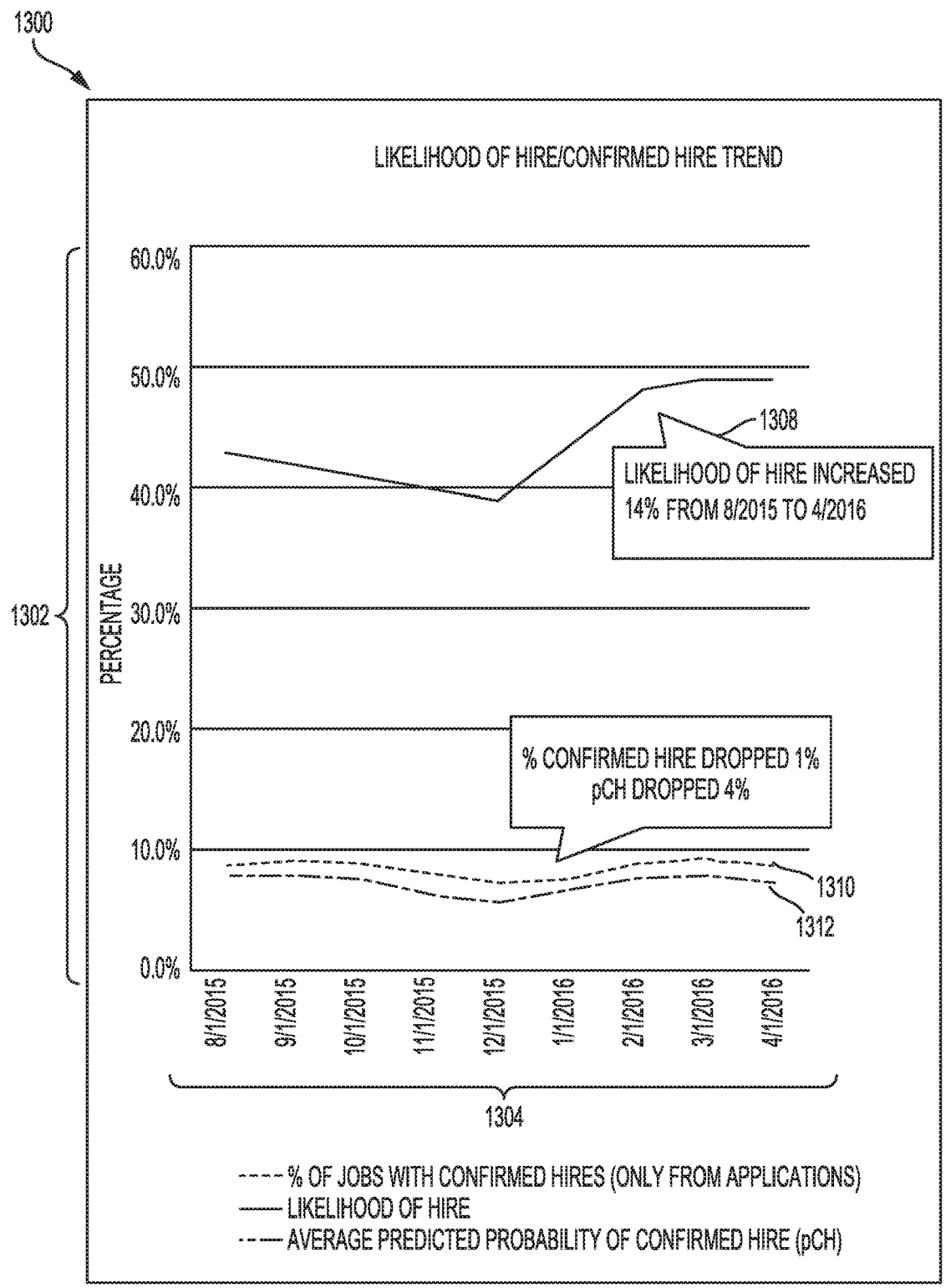
FIG. 13 is a chart depicting correlations between pCH percentages and likelihoods of hire, percentages of jobs with confirmed hires, and average predicted pCH over time, according to some embodiments.

FIG. 13 is a chart 1300 depicting correlations between pCH percentages 1302 and likelihoods of hire 1308, percentages of jobs with confirmed hires 1310 and average predicted pCH 1312 over time 1304 (e.g., months in the example of FIG. 13).

Figure 14:
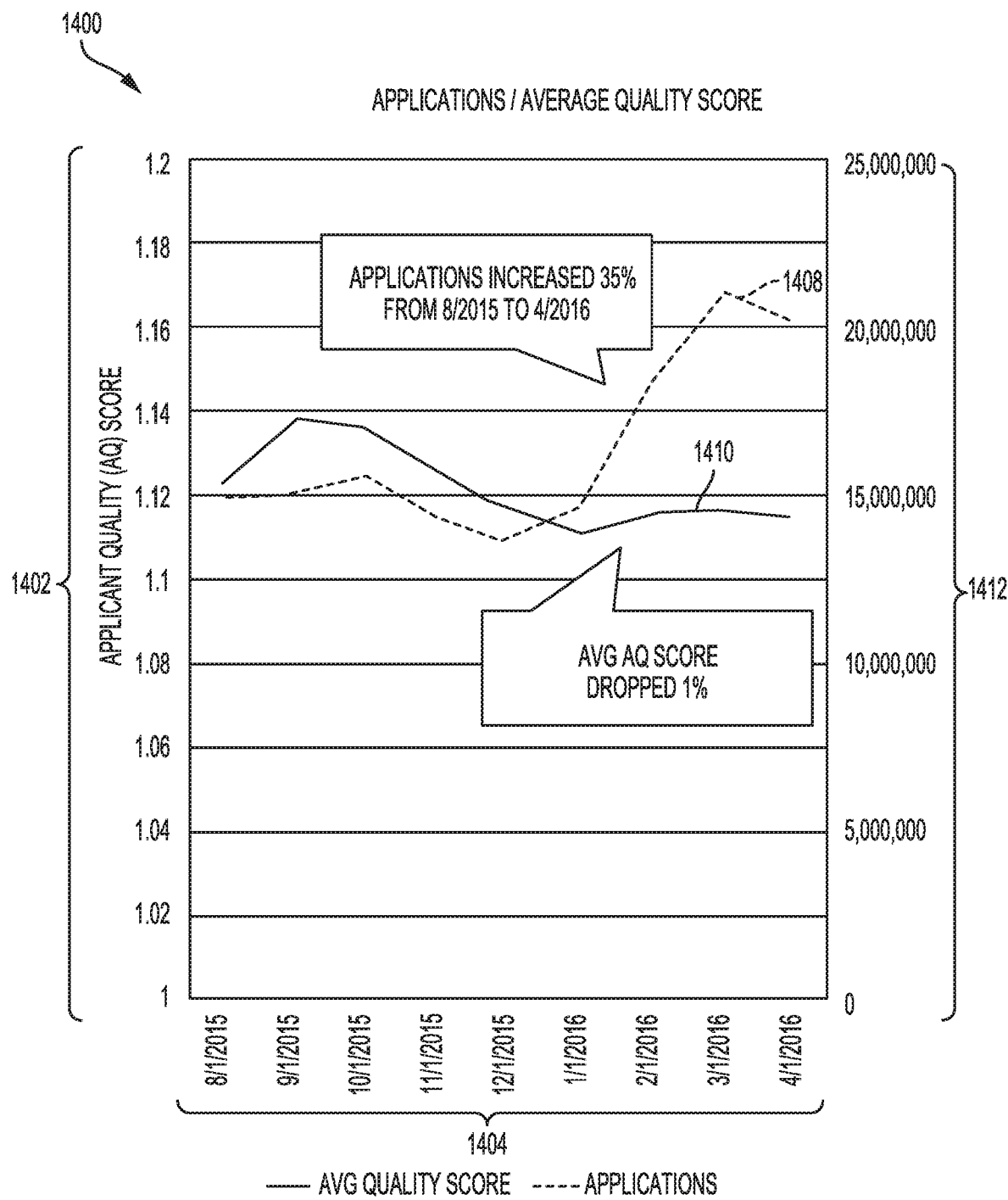
FIG. 14 is a chart depicting trends for average AQ scores and job applications, according to some embodiments.

FIG. 14 is a chart 1400 depicting trends for correlations between AQ scores 1402 and average AQ scores 1410 and job applications 1408 over time 1404. As shown, as a total number of applicants 1412 increased, the average AQ scores 1410 dropped slightly (by 1% in the example of FIG. 14).

Figure 15:
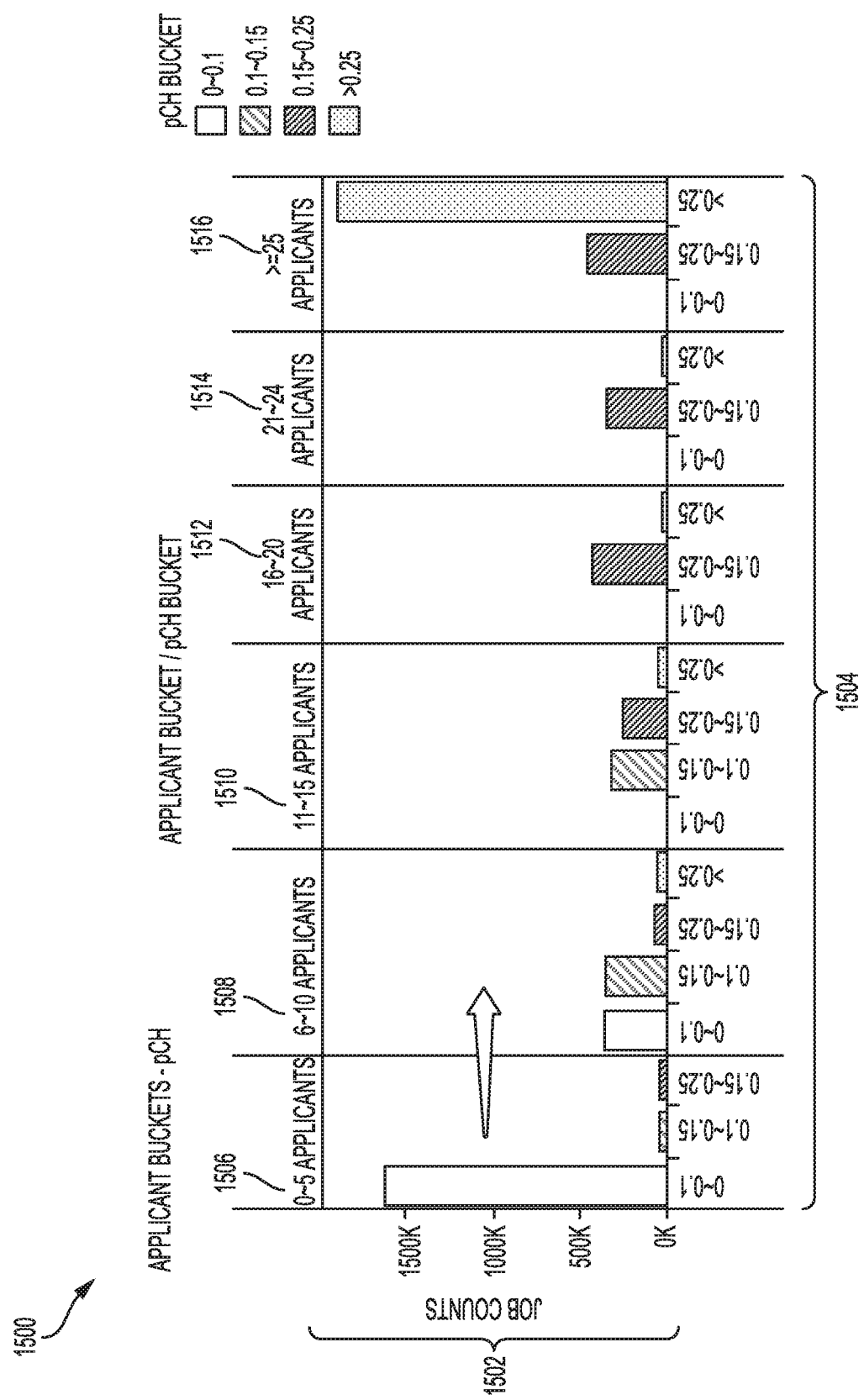
FIG. 15 is a chart depicting pCH distributions across jobs with different numbers of applicants, according to some embodiments.

FIG. 15 is a chart 1500 depicting pCH distributions 1504 (e.g., pCH buckets) across jobs 1502 with different numbers of applicants. As shown, the pCH distributions 1504 varied for different numbers of applicants (e.g., applicant buckets 1506, 1508, 1510, 1512, 1514, and 1516). In the example of FIG. 15, the applicant buckets 1506, 1508, 1510, 1512, 1514, and 1516 correspond to jobs having 0-5 applicants, 6-10 applicants, 11-15 applicants, 16-20 applicants, 21-24 applicants, and greater than 24 applicants, respectively.

Figure 16:
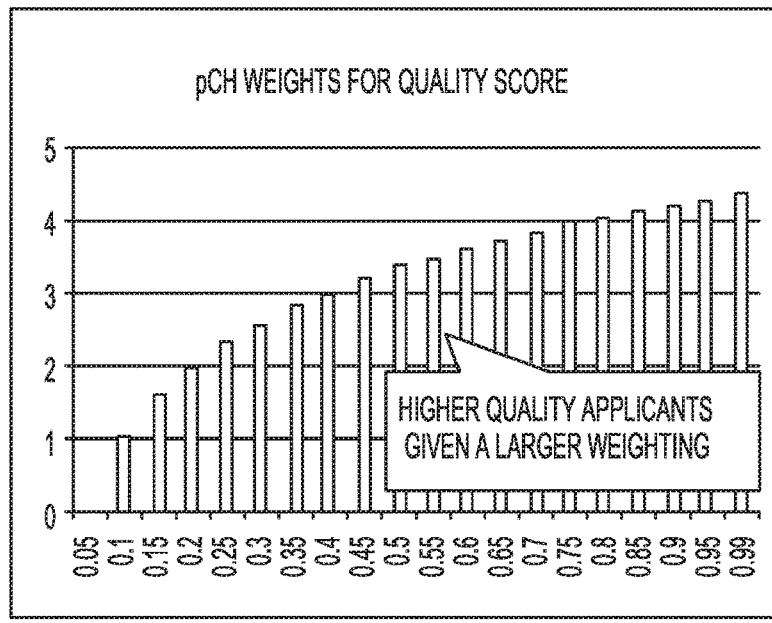
FIG. 16 provides charts depicting pCH weights for quality scores and weighted quality scores, according to some embodiments.
Figure 16:
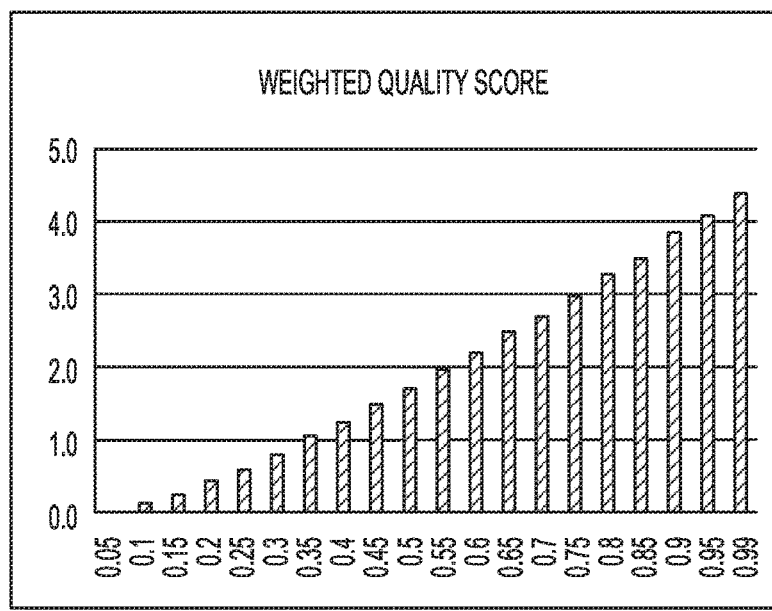

FIG. 16 provides charts 1600 depicting pCH weights 1604 for quality scores 1602 and weighted quality scores 1610. As shown, by giving higher-quality applicants (applicants having relatively high quality scores 1602) larger weights 1608, the corresponding weighted quality scores 1610 are greater.

Figure 17:
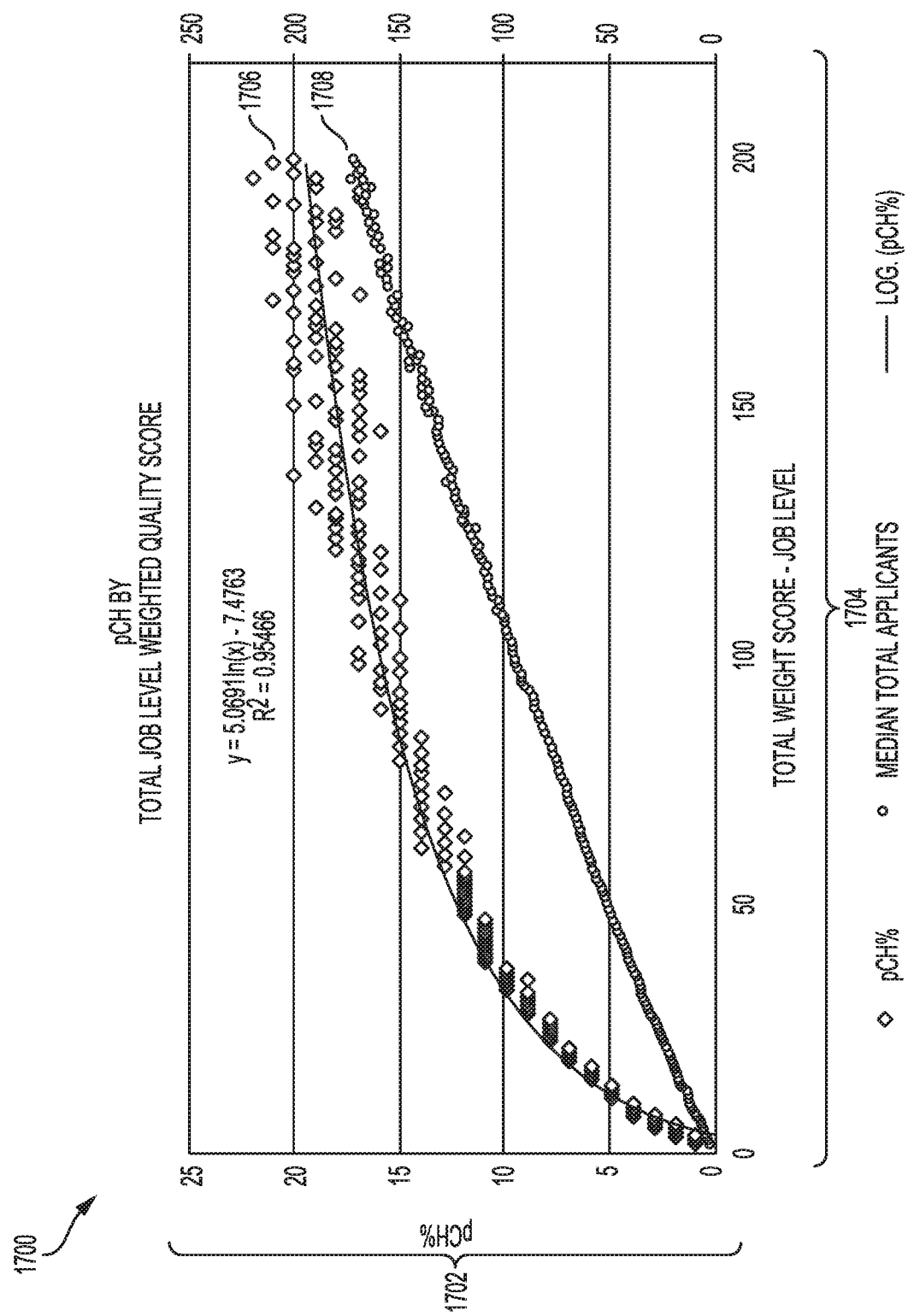
FIG. 17 is a chart depicting correlations between pCH values and total job-level weighted quality scores, according to some embodiments.

FIG. 17 is a chart 1700 depicting correlations between pCH percentages 1702 and total job-level weighted quality scores 1704.

Figure 18:
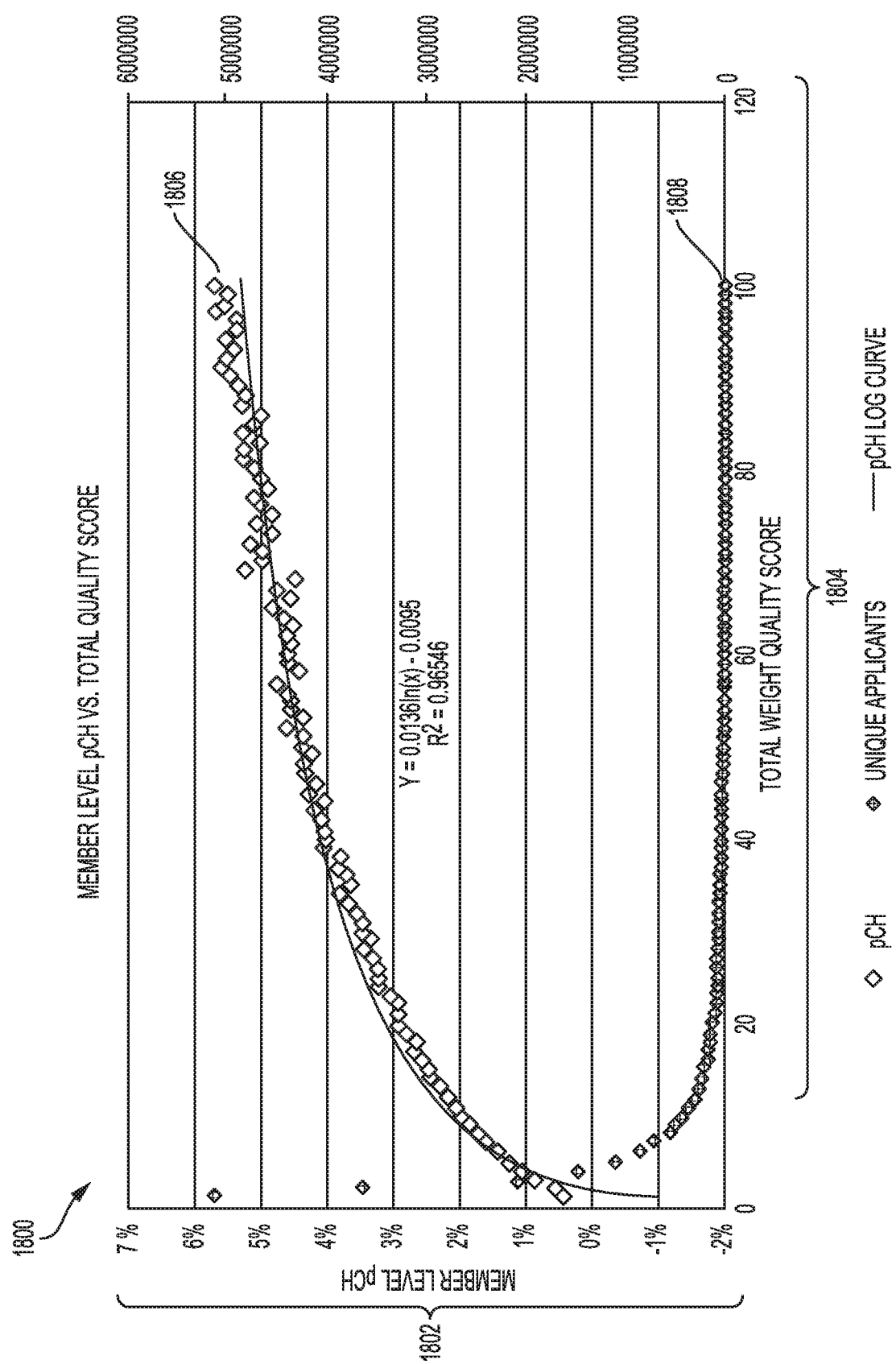
FIG. 18 is a chart depicting correlations between member-level pCH values and total quality scores, according to some embodiments.

FIG. 18 is a chart 1800 depicting correlations between member-level pCH percentages 1802 and total quality scores 1804.

Figure 19:
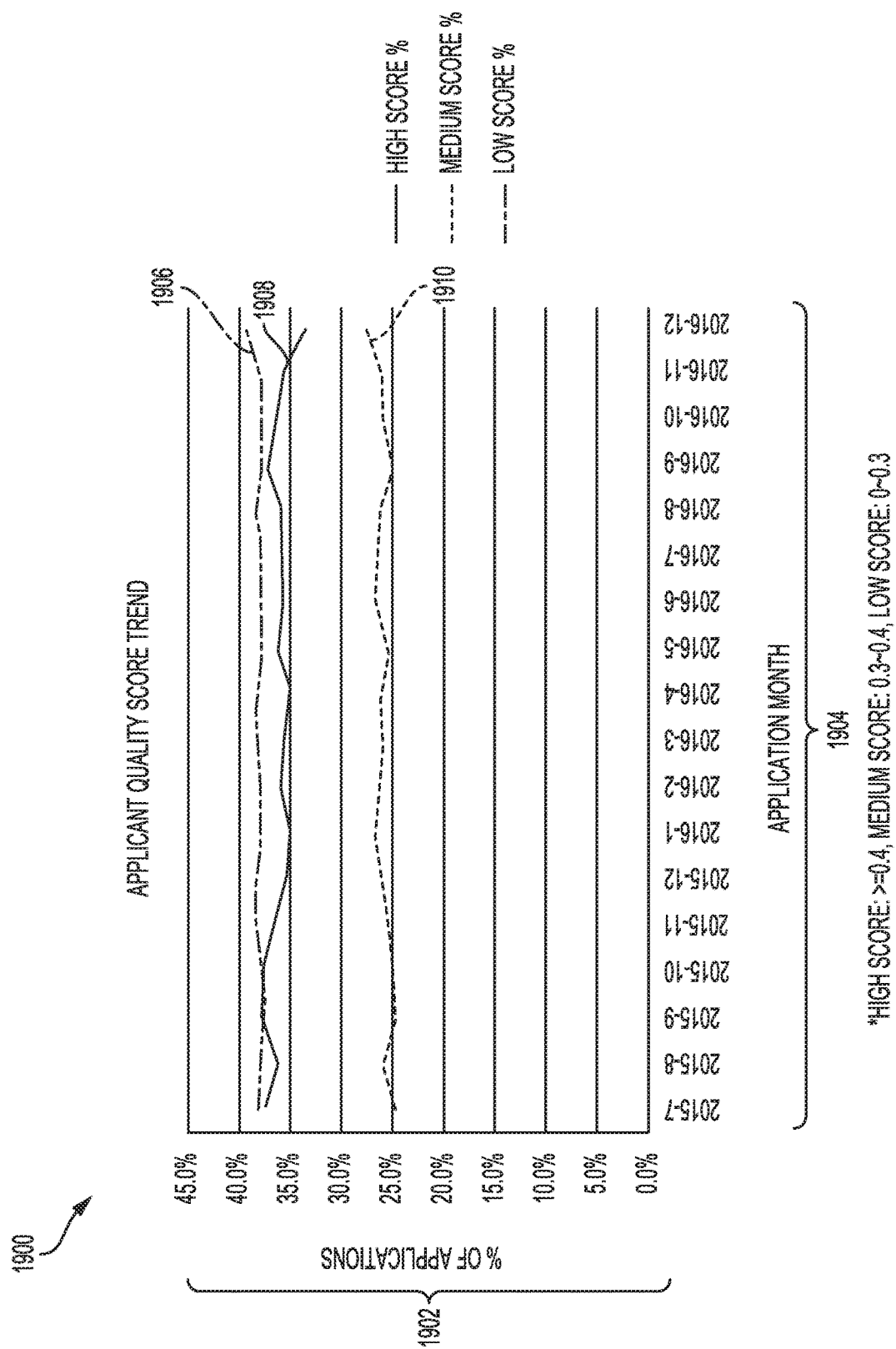
FIG. 19 is a chart depicting trends for applicant quality scores, according to some embodiments.

FIG. 19 is a chart 1900 depicting trends for applicant quality scores (e.g., high scores 1908, medium scores 1910, and low scores 1906) in terms of percentages of applications 1902 across time 1904. In the example of FIG. 19, the high scores 1908 are scores greater than or equal to 0.4, the medium scores 1910 range from 0.3-0.4, and the low scores 1906 range from 0.0-0.3.

Figure 20:
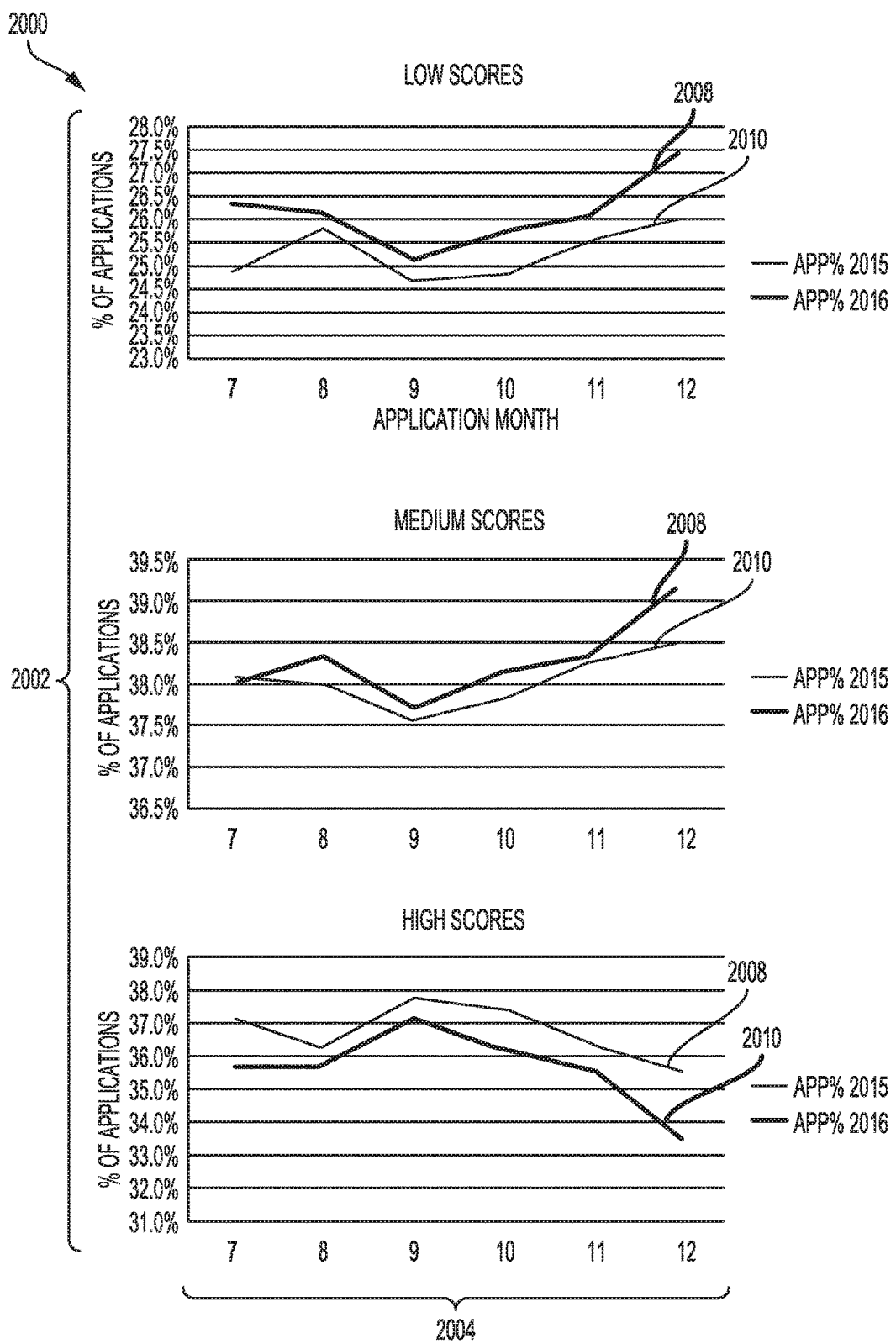
FIG. 20 provides charts depicting year-to-year (Y/Y) comparisons of applicant quality score trends, according to some embodiments.

FIG. 20 provides charts 2000 depicting year to year (Y/Y) comparisons of applicant quality score trends 2008 and 2010 in terms of percentages of applications 2002 across application months 2004 (e.g., July-December in the example of FIG. 20).

Software Architecture

Figure 21:
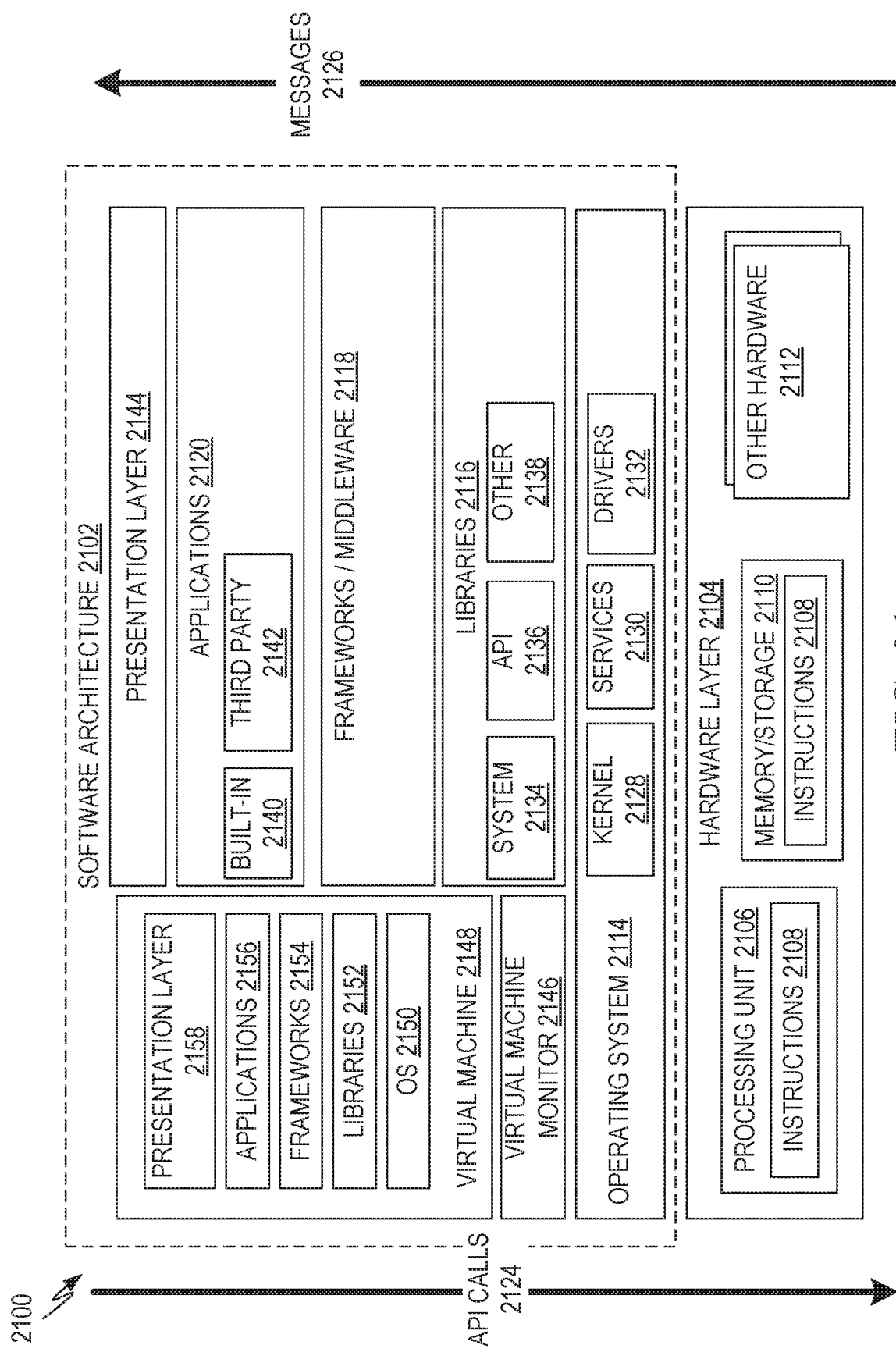
FIG. 21 is a block diagram illustrating a representative software architecture, which may be used in conjunction with various hardware architectures herein described.

FIG. 21 is a block diagram 2100 illustrating a representative software architecture 2102, which may be used in conjunction with various hardware architectures herein described. FIG. 21 is merely a non-limiting example of a software architecture, and it will be appreciated that many other architectures may be implemented to facilitate the functionality described herein. The software architecture 2102 may be executing on hardware such as a machine 2200 of FIG. 22 that includes, among other things, processors 2210, memory/storage 2230, and I/O components 2250. A representative hardware layer 2104 is illustrated and can represent, for example, the machine 2200 of FIG. 22. The representative hardware layer 2104 comprises one or more processing units 2106 having associated executable instructions 2108. The executable instructions 2108 represent the executable instructions of the software architecture 2102, including implementation of the methods, modules, user interfaces, and so forth of FIGS. 1-20. The hardware layer 2104 also includes memory and/or storage modules 2110, which also have the executable instructions 2108. The hardware layer 2104 may also comprise other hardware 2112, which represents any other hardware of the hardware layer 2104, such as the other hardware illustrated as part of the machine 2200.

In the example architecture of FIG. 21, the software architecture 2102 may be conceptualized as a stack of layers where each layer provides particular functionality. For example, the software architecture 2102 may include layers such as an operating system 2114, libraries 2116, frameworks/middleware 2118, applications 2120, and a presentation layer 2144. Operationally, the applications 2120 and/or other components within the layers may invoke API calls 2124 through the software stack and receive responses, returned values, and so forth, illustrated as messages 2126, in response to the API calls 2124. The layers illustrated are representative in nature and not all software architectures have all layers. For example, some mobile or special-purpose operating systems may not provide a layer of frameworks/middleware 2118, while others may provide such a layer. Other software architectures may include additional or different layers.

The operating system 2114 may manage hardware resources and provide common services. The operating system 2114 may include, for example, a kernel 2128, services 2130, and drivers 2132. The kernel 2128 may act as an abstraction layer between the hardware and the other software layers. For example, the kernel 2128 may be responsible for memory management, processor management (e.g., scheduling), component management, networking, security settings, and so on. The services 2130 may provide other common services for the other software layers. The drivers 2132 may be responsible for controlling or interfacing with the underlying hardware. For instance, the drivers 2132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2116 may provide a common infrastructure that may be utilized by the applications 2120 and/or other components and/or layers. The libraries 2116 typically provide functionality that allows other software modules to perform tasks in an easier fashion than by interfacing directly with the underlying operating system 2114 functionality (e.g., kernel 2128, services 2130, and/or drivers 2132). The libraries 2116 may include system libraries 2134 (e.g., C standard library) that may provide functions such as memory allocation functions, string manipulation functions, mathematic functions, and the like. In addition, the libraries 2116 may include API libraries 2136 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 2116 may also include a wide variety of other libraries 2138 to provide many other APIs to the applications 2120 and other software components/modules.

The frameworks 2118 (also sometimes referred to as middleware) may provide a higher-level common infrastructure that may be utilized by the applications 2120 and/or other software components/modules. For example, the frameworks 2118 may provide various graphic user interface (GUI) functions, high-level resource management, high-level location services, and so forth. The frameworks 2118 may provide a broad spectrum of other APIs that may be utilized by the applications 2120 and/or other software components/modules, some of which may be specific to a particular operating system or platform.

The applications 2120 include built-in applications 2140 and/or third-party applications 2142. Examples of representative built-in applications 2140 may include, but are not limited to, a contacts application, a browser application, a book reader application, a location application, a media application, a messaging application, and/or a game application. The third-party applications 2142 may include any of the built-in applications 2140 as well as a broad assortment of other applications. In a specific example, the third-party application 2142 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 2142 may invoke the API calls 2124 provided by the mobile operating system such as the operating system 2114 to facilitate functionality described herein.

The applications 2120 may utilize built-in operating system 2114 functions (e.g., kernel 2128, services 2130, and/or drivers 2132), libraries 2116 (e.g., system libraries 2134, API libraries 2136, and other libraries 2138), and frameworks/middleware 2118 to create user interfaces to interact with users of the system. Alternatively, or additionally, in some systems, interactions with a user may occur through a presentation layer, such as the presentation layer 2144. In these systems, the application/module "logic" can be separated from the aspects of the application/module that interact with a user.

Some software architectures utilize virtual machines. In the example of FIG. 21, this is illustrated by a virtual machine 2148. A virtual machine creates a software environment where applications/modules can execute as if they were executing on a hardware machine (such as the machine 2200 of FIG. 22, for example). A virtual machine is hosted by a host operating system (e.g., operating system 2114 in FIG. 21) and typically, although not always, has a virtual machine monitor 2146, which manages the operation of the virtual machine 2148 as well as the interface with the host operating system (e.g., operating system 2114). A software architecture executes within the virtual machine 2148, such as an operating system 2150, libraries 2152, frameworks/middleware 2154, applications 2156, and/or a presentation layer 2158. These layers of software architecture executing within the virtual machine 2148 can be the same as corresponding layers previously described or may be different.

Example Architecture and Machine-Readable Medium

Figure 22:
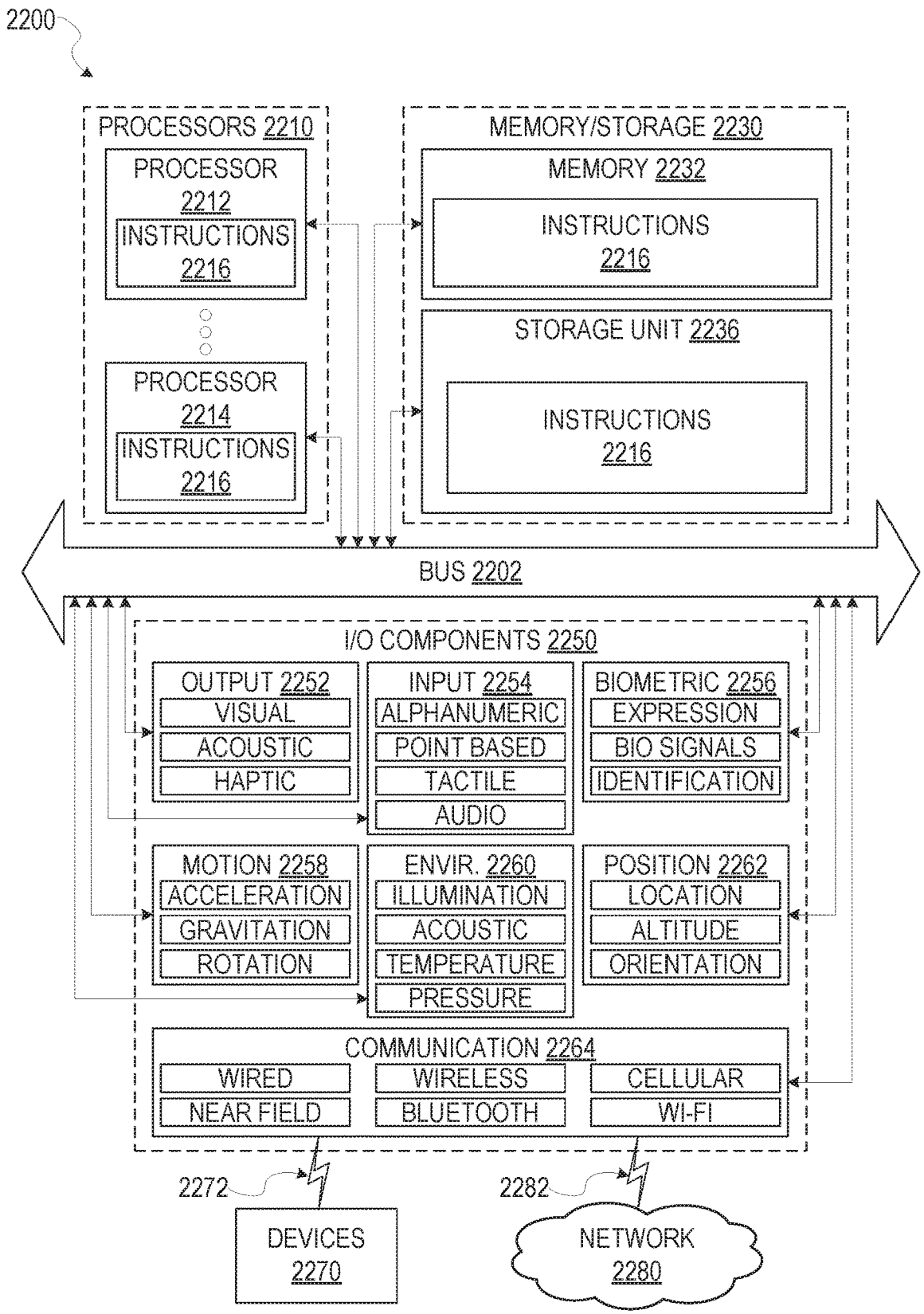
FIG. 22 is a block diagram illustrating components of a machine, according to some example embodiments, able to read instructions from a machine-readable medium (e.g., a machine-readable storage medium) and perform any one or more of the methodologies discussed herein.

FIG. 22 is a block diagram illustrating components of a machine 2200, according to some example embodiments, able to read instructions from a machine-readable medium (e.g., a machine-readable storage medium) and perform any one or more of the methodologies discussed herein. Specifically, FIG. 22 shows a diagrammatic representation of the machine 2200 in the example form of a computer system, within which instructions 2216 (e.g., software, a program, an application, an applet, an app, or other executable code) for causing the machine 2200 to perform any one or more of the methodologies discussed herein may be executed. The instructions 2216 transform the general, non-programmed machine into a particular machine programmed to carry out the described and illustrated functions in the manner described. In alternative embodiments, the machine 2200 operates as a standalone device or may be coupled (e.g., networked) to other machines. In a networked deployment, the machine 2200 may operate in the capacity of a server machine or a client machine in a server-client network environment, or as a peer machine in a peer-to-peer (or distributed) network environment. The machine 2200 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2216, sequentially or otherwise, that specify actions to be taken by the machine 2200. Further, while only a single machine 2200 is illustrated, the term "machine" shall also be taken to include a collection of machines 2200 that individually or jointly execute the instructions 2216 to perform any one or more of the methodologies discussed herein.

The machine 2200 may include processors 2210, memory/storage 2230, and I/O components 2250, which may be configured to communicate with each other such as via a bus 2202. In an example embodiment, the processors 2210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an application-specific integrated circuit (ASIC), a Radio-Frequency Integrated Circuit (RFIC), another processor, or any suitable combination thereof) may include, for example, a processor 2212 and a processor 2214 that may execute the instructions 2216. The term "processor" is intended to include multi-core processors that may comprise two or more independent processors (sometimes referred to as "cores") that may execute instructions contemporaneously. Although FIG. 22 shows multiple processors 2210, the machine 2200 may include a single processor with a single core, a single processor with multiple cores (e.g., a multi-core processor), multiple processors with a single core, multiple processors with multiples cores, or any combination thereof.

The memory/storage 2230 may include a memory 2232, such as a main memory, or other memory storage, and a storage unit 2236, both accessible to the processors 2210 such as via the bus 2202. The storage unit 2236 and memory 2232 store the instructions 2216 embodying any one or more of the methodologies or functions described herein. The instructions 2216 may also reside, completely or partially, within the memory 2232, within the storage unit 2236, within at least one of the processors 2210 (e.g., within the processor's cache memory), or any suitable combination thereof, during execution thereof by the machine 2200. Accordingly, the memory 2232, the storage unit 2236, and the memory of the processors 2210 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 2216. The term "machine-readable medium" shall also be taken to include any medium, or combination of multiple media, that is capable of storing instructions (e.g., instructions 2216) for execution by a machine (e.g., machine 2200), such that the instructions, when executed by one or more processors of the machine (e.g., processors 2210), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2250 may include a wide variety of components to receive input, provide output, produce output, transmit information, exchange information, capture measurements, and so on. The specific I/O components 2250 that are included in a particular machine will depend on the type of machine. For example, portable machines such as mobile phones will likely include a touch input device or other such input mechanisms, while a headless server machine will likely not include such a touch input device. It will be appreciated that the I/O components 2250 may include many other components that are not shown in FIG. 22. The I/O components 2250 are grouped according to functionality merely for simplifying the following discussion and the grouping is in no way limiting. In various example embodiments, the I/O components 2250 may include output components 2252 and input components 2254.

The output components 2252 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2250 may include biometric components 2256, motion components 2258, environmental components 2260, or position components 2262, among a wide array of other components. For example, the biometric components 2256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2258 may include acceleration sensor components (e.g., accelerometer), gravitation sensor components, rotation sensor components (e.g., gyroscope), and so forth.

The environmental components 2260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2250 may include communication components 2264 operable to couple the machine 2200 to a network 2280 or devices 2270 via a coupling 2282 and a coupling 2272, respectively. For example, the communication components 2264 may include a network interface component or other suitable device to interface with the network 2280. In further examples, the communication components 2264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2270 may be another machine or any of a wide variety of peripheral devices (e.g., a peripheral device coupled via a USB).

Moreover, the communication components 2264 may detect identifiers or include components operable to detect identifiers. For example, the communication components 2264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2264, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 2280 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2280 or a portion of the network 2280 may include a wireless or cellular network and the coupling 2282 may be a Code Division Multiple Access (CDMA) connection, a Global System for Mobile communications (GSM) connection, or another type of cellular or wireless coupling. In this example, the coupling 2282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 2216 may be transmitted or received over the network 2280 using a transmission medium via a network interface device (e.g., a network interface component included in the communication components 2264) and utilizing any one of a number of well-known transfer protocols (e.g., HTTP). Similarly, the instructions 2216 may be transmitted or received using a transmission medium via the coupling 2272 (e.g., a peer-to-peer coupling) to the devices 2270. The term 'transmission medium'shall be taken to include any intangible medium that is capable of storing, encoding, or carrying the instructions 2216 for execution by the machine 2200, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or an exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer system, comprising:
a processor;
a storage device;
a candidate predictor engine; and
a memory device holding an instruction set executable on the processor to cause the computer system to perform operations comprising:
training a machine learning model to encode an applicant quality (AQ) score for a job/applicant pair based on input features comprising job features associated with the job of the job/applicant pair, and member profile features associated with a member profile of the applicant of the job/applicant pair;
encoding, by the candidate predictor engine using the trained model, data representing an applicant quality (AQ) score for each job/applicant pair for a plurality of applicants to a job posting;
storing, on the storage device, the encoded data representing the AQ scores for each job/applicant pair for the plurality of applicants to the job posting;
assigning member-level weights to each of the plurality of applicants;
calculating, by the candidate predictor engine, weighted AQ scores for each of the job/applicant pairs, the weighted AQ scores being products of respective AQ scores retrieved from the storage device and member-level weights;
summing the weighted AQ scores to derive a total weighted score for the job posting;
generating, by the candidate predictor engine, a job-level probability of confirmed hire (pCH) based on the total weighted score, the job-level pCH indicating a likelihood of the job posting being filled by an applicant; and
transmitting the job-level pCH to a client device for display.

2. The computer system of claim 1, wherein assigning member-level weights to each of the plurality of applicants comprises:
retrieving, from the storage device, the respective AQ scores of the plurality of applicants; and
assigning greater weights to applicants with higher AQ scores.

3. The computer system of claim 1, wherein the AQ scores are encoded by the candidate predictor engine using the trained model based in part on at least one pre-defined type of candidate feature retrieved from a job candidate context feature set stored on the storage device, the candidate feature comprising at least one of a job function descriptor represented in a social network service profile of a target candidate account, a job industry descriptor represented in the social network service profile of the target candidate account, and a job company size descriptor represented in the social network service profile of the target candidate account.

4. The computer system of claim 3, wherein encoding the data representing the AQ score for each job/applicant pair comprises encoding a candidate-to-job comparison feature data subset to include a difference value that corresponds with a pre-defined type of comparison feature that is learned as being predictive of whether a given job candidate is qualified for a given job posting, encoding the candidate-to-job comparison feature data subset comprising:
identifying years of candidate professional experience based on at least one employment time period descriptor in a social network service profile of the target candidate account;
identifying years of required professional experience described in the job posting;
calculating a years difference value to represent a difference between the years of candidate professional experience and the years of required professional experience;
inserting the years difference value into the candidate-to-job comparison feature data subset as a respective comparison feature; and
storing the candidate-to-job comparison feature data subset on the storage device.

5. The computer system of claim 4, wherein inserting the years difference value into the candidate-to-job comparison feature data subset as the respective comparison feature comprises:
encoding the years difference value into a pre-defined data position for a years difference comparison feature in the candidate-to-job comparison feature data subset; and
storing the candidate-to-job comparison feature data subset on the storage device.

6. The computer system of claim 3, wherein encoding the data representing the AQ score for each job/applicant pair comprises encoding a candidate-to-job comparison feature data subset to include a difference value that corresponds with a pre-defined type of comparison feature that is learned as being predictive of whether a given job candidate is qualified for a given job posting, encoding the candidate-to-job comparison feature data subset comprising:

identifying each skill descriptor in a social network service profile of the target candidate account;

identifying each skill descriptor described in the job posting;

calculating a skill match value to represent a percentage of matching skill descriptors between the target candidate account's skill descriptors and the job posting's skill descriptors;

inserting the skill match value into the candidate-to-job comparison feature data subset as a respective comparison feature; and storing the candidate-to-job comparison feature data subset on the storage device.

7. The computer system of claim 6, wherein each skill descriptor in the social network service profile of the target candidate account comprises a respective skill descriptor selected by the target candidate account.

8. The computer system of claim 6, wherein each skill descriptor in the social network service profile of the target candidate account comprises a respective skill descriptor selected by a member account having a social network connection with the target candidate account.

9. The computer system of claim 6, wherein inserting the skill match value into the candidate-to-job comparison feature data subset as a respective comparison feature comprises:

encoding the skill match value into a pre-defined data position for a skill match comparison feature in the candidate-to-job comparison feature data subset; and storing the candidate-to-job comparison feature data subset on the storage device.

10. The computer system of claim 1, wherein the candidate predictor engine comprises a prediction generator, and wherein generating the job-level pCH further comprises generating, by the prediction generator, a prediction output based on job-level characteristics including one or more of a channel, an application path, and an organization size, the prediction output indicating whether applicants of the plurality of applicants are qualified for the job posting.

11. The computer system of claim 10, wherein the job-level characteristics include at least one pre-defined type of job feature comprising at least one of a job function descriptor represented in the job posting, a job industry descriptor represented in the job posting, and a job company size descriptor represented in the job posting.

12. The computer system of claim 1, wherein the operations further comprise instantiating a plurality of job candidate decision trees, each job candidate decision tree comprising at least one learned decision tree branch label, instantiating the plurality of job candidate decision trees comprising:

collecting, from within a social network service, logged interaction data comprising at least a first previous determination, by a first employer account, of a first candidate account as qualified for a first job posting, and a second previous determination, by a second employer account, of a second candidate account as not qualified for a second job posting.

13. The computer system of claim 12, wherein instantiating the plurality of job candidate decision trees, each job candidate decision tree comprising at least one learned decision tree branch label, further comprises:

executing a random forest process with the logged interaction data to build each job candidate decision tree by learning a branch label for each branch of each job candidate decision tree based on at least one attribute of the logged interaction data.

14. A computer-implemented method, comprising:

training a machine learning model to encode an applicant quality (AQ) score for a job/applicant pair based on input features comprising job features associated with the job of the job/applicant pair, and member profile features associated with a member profile of the applicant of the job/applicant pair;

encoding, using the trained model, data representing an applicant quality (AQ) score for each job/applicant pair for a plurality of applicants to a job posting;

assigning member-level weights to each of the plurality of applicants;

calculating weighted AQ scores for each of the job/applicant pairs, the weighted AQ scores being products of respective AQ scores and member-level weights;

summing the weighted AQ scores to derive a total weighted score for the job posting;

generating a job-level probability of confirmed hire (pCH) based on the total weighted score, the job-level pCH indicating a likelihood of the job posting being filled by an applicant; and transmitting the job-level pCH to a client device for display.

15. The computer-implemented method of claim 14, wherein encoding the data representing the AQ score for each job/applicant pair comprises encoding data representing a job candidate context feature set based on at least one attribute of a target candidate account of a social network service and at least one attribute of a job posting on the social network service, encoding the data representing the job candidate context feature set comprising:

encoding a job candidate feature data subset to include the at least one attribute of the target candidate account that corresponds with at least one pre-defined type of candidate feature that is learned as being predictive of whether a given job candidate is qualified for a given job posting;

encoding a job feature data subset to include the at least one attribute of the job posting that corresponds with at least one pre-defined type of job feature that is learned as being predictive of whether the given job candidate is qualified for the given job posting; and encoding a candidate-to-job comparison feature data subset to include a difference value between the at least one attribute of the target candidate account and the at least one attribute of the job posting that corresponds with a pre-defined type of comparison feature that is learned as being predictive of whether the given job candidate is qualified for the given job posting.

16. The computer-implemented method of claim 15, wherein encoding the candidate-to-job comparison feature data subset to include the difference value that corresponds with the pre-defined type of comparison feature that is learned as being predictive of whether the given job candidate is qualified for the given job posting comprises:

identifying years of candidate professional experience based on at least one employment time period descriptor in a social network service profile of the target candidate account;

identifying years of required professional experience described in the job posting on the social network service;

calculating a years difference value to represent a difference between the years of candidate professional experience and the years of required professional experience; and inserting the years difference value into the candidate-to-job comparison feature data subset as a respective comparison feature.

17. The computer-implemented method of claim 16, wherein inserting the years difference value into the candidate-to-job comparison feature data subset as a respective comparison feature comprises:

encoding the years difference value into a pre-defined data position for a years difference comparison feature in the candidate-to-job comparison feature data subset.

18. The computer-implemented method of claim 15, wherein encoding the candidate-to-job comparison feature data subset to include the difference value that corresponds with the pre-defined type of comparison feature that is learned as being predictive of whether the given job candidate is qualified for the given job posting comprises:

identifying each skill descriptor in a social network service profile of the target candidate account;

identifying each skill descriptor described in the job posting on the social network service;

calculating a skill match value to represent a percentage of matching skill descriptors between the target candidate account's skill descriptors and the job posting's skill descriptors; and inserting the skill match value into the candidate-to-job comparison feature data subset as a respective comparison feature.

19. The computer system of claim 18, wherein each skill descriptor in the social network service profile of the target candidate account comprises a respective skill descriptor selected by the target candidate account.

20. A non-transitory computer-readable medium storing executable instructions thereon, which, when executed by a processor, cause the processor to perform operations including:

training a machine learning model to encode an applicant quality (AQ) score for a job/applicant pair based on input features comprising job features associated with the job of the job/applicant pair, and member profile features associated with a member profile of the applicant of the job/applicant pair;

Encoding, using the trained model, data representing an applicant quality (AQ) score for each job/applicant pair for a plurality of applicants to a job posting, the AQ score being based on an AQ model;

assigning member-level weights to each of the plurality of applicants;

calculating weighted AQ scores for each of the job/applicant pairs, the weighted AQ scores being products of respective AQ scores and member-level weights;

summing the weighted AQ scores to derive a total weighted score for the job posting;

generating a job-level probability of confirmed hire (pCH) based on the total weighted score, the job-level pCH indicating a likelihood of the job posting being filled by an applicant; and transmitting the job-level pCH to a client device for display.

* * * * *

UNITED STATES PATENT AND TRADEMARK OFFICE
CERTIFICATE OF CORRECTION

PATENT NO. : 11,132,645 B2
APPLICATION NO. : 15/660779
DATED : September 28, 2021
INVENTOR(S) : Liang et al.

It is certified that error appears in the above-identified patent and that said Letters Patent is hereby corrected as shown below:

In the Claims

In Column 32, Line 1, in Claim 19, delete "computer system" and insert --computer-implemented method-- therefor Signed and Sealed this
Twenty-first Day of December, 2021

Drew Hirshfeld
*Performing the Functions and Duties of the
Under Secretary of Commerce for Intellectual Property and
Director of the United States Patent and Trademark Office*